United States Patent
Lee

(10) Patent No.: US 11,882,906 B2
(45) Date of Patent: Jan. 30, 2024

(54) DUAL ENGAGEMENT FASTENER

(71) Applicant: ILLINOIS TOOL WORKS INC., Glenview, IL (US)

(72) Inventor: Joel R. Lee, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 74 days.

(21) Appl. No.: 16/820,974

(22) Filed: Mar. 17, 2020

(65) Prior Publication Data
US 2020/0315302 A1 Oct. 8, 2020

Related U.S. Application Data

(60) Provisional application No. 62/886,156, filed on Aug. 13, 2019, provisional application No. 62/828,639, filed on Apr. 3, 2019.

(51) Int. Cl.
*A44B 17/00* (2006.01)

(52) U.S. Cl.
CPC ........ *A44B 17/007* (2013.01); *A44B 17/0047* (2013.01)

(58) Field of Classification Search
CPC . A44B 17/007; A44B 17/0047; Y10T 24/309; Y10T 24/44026; F16B 21/086; F16B 5/065; F16B 5/0628; F16B 19/1081
See application file for complete search history.

(56) References Cited

U.S. PATENT DOCUMENTS

| | | | | |
|---|---|---|---|---|
| 5,197,840 A * | 3/1993 | Peek | ................... | F16B 37/0842 411/433 |
| 5,850,676 A * | 12/1998 | Takahashi | ........... | F16B 19/1045 24/297 |
| 6,088,878 A * | 7/2000 | Antonucci | .............. | E05F 5/022 24/297 |
| 6,119,306 A * | 9/2000 | Antonucci | .............. | E05F 5/022 16/86 A |
| 6,345,946 B1 * | 2/2002 | Mainini | ................ | F16B 21/086 411/339 |
| 6,514,023 B2 * | 2/2003 | Moerke | ............... | F16B 19/1081 411/41 |
| 7,272,873 B2 * | 9/2007 | Nessel | ................... | F16B 5/0657 24/297 |
| 7,757,997 B2 * | 7/2010 | Smutny | ................. | F16B 21/086 248/71 |
| 8,011,206 B2 * | 9/2011 | Imai | ..................... | A44C 25/007 63/23 |
| 8,245,367 B2 * | 8/2012 | Kato | ....................... | F16B 45/00 24/456 |
| 8,677,573 B2 * | 3/2014 | Lee | ........................ | F16B 21/076 24/297 |

(Continued)

FOREIGN PATENT DOCUMENTS

| | | | | |
|---|---|---|---|---|
| DE | 102013016359 A1 * | 7/2014 | ......... | B60R 13/0206 |
| KR | 20090082116 A * | 7/2009 | | |
| WO | WO-2012117947 A1 * | 9/2012 | .......... | F16B 19/1081 |

*Primary Examiner* — Victor D Batson
*Assistant Examiner* — Matthew J Sullivan
(74) *Attorney, Agent, or Firm* — Quarles & Brady LLP

(57) ABSTRACT

A fastener assembly includes an insert and a base. The insert has a first plurality of teeth. The base defines a cavity to receive the insert and includes a second plurality of teeth to engage with the first plurality of teeth.

13 Claims, 25 Drawing Sheets

(56) References Cited

U.S. PATENT DOCUMENTS

| | | | | |
|---|---|---|---|---|
| 8,695,177 | B2* | 4/2014 | Kato | F16B 21/065 |
| | | | | 24/297 |
| 9,790,976 | B2* | 10/2017 | Nakajima | F16B 19/1081 |
| 10,023,371 | B2* | 7/2018 | Calabrese | A44B 17/0076 |
| 10,036,410 | B2* | 7/2018 | Lesecq | F16B 19/1081 |
| 2003/0000048 | A1* | 1/2003 | Boville | B60R 13/0206 |
| | | | | 24/297 |
| 2021/0062847 | A1* | 3/2021 | McClure | F16B 5/0258 |

* cited by examiner

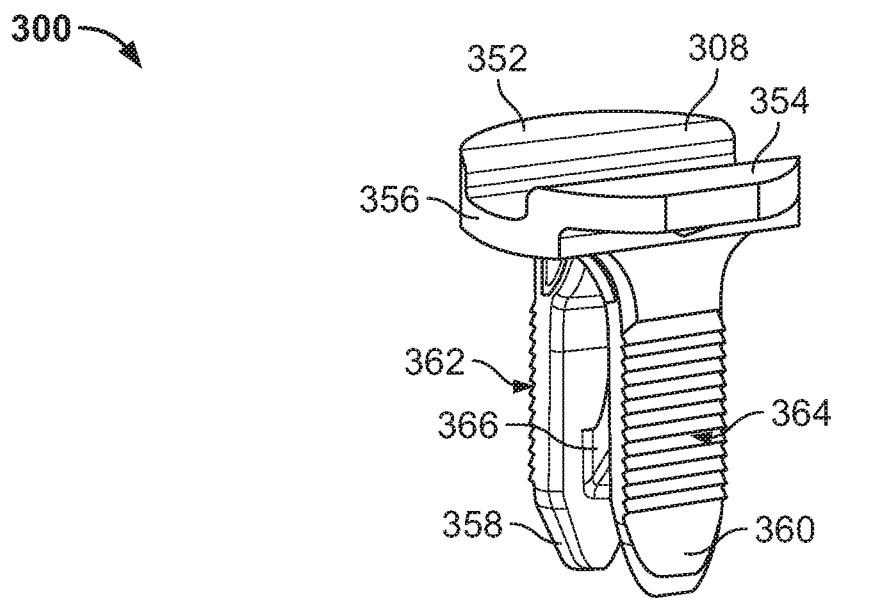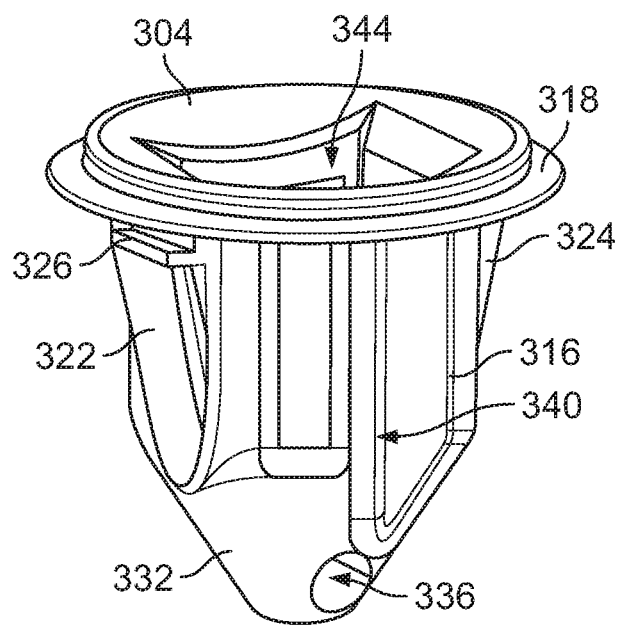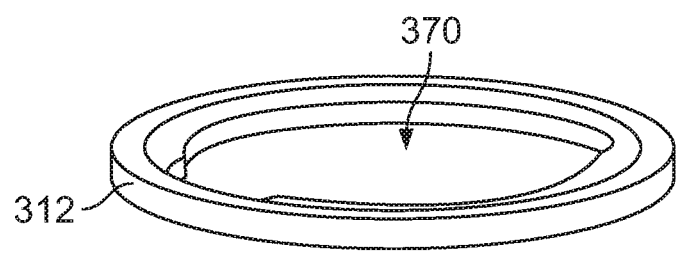
FIG. 21

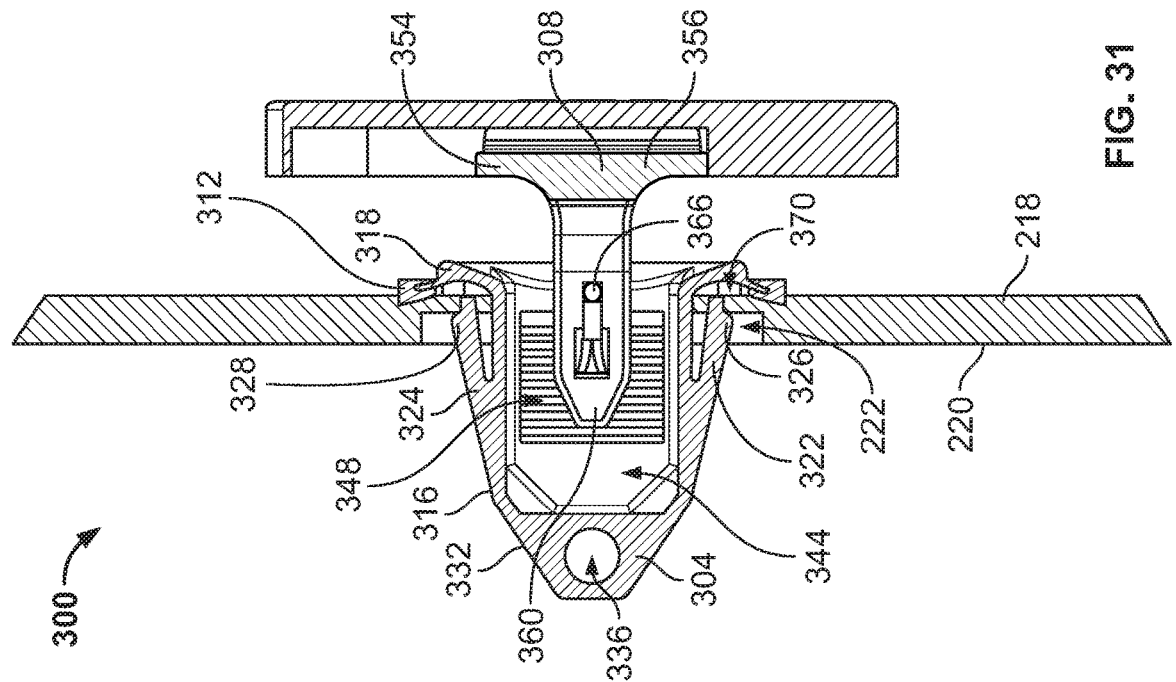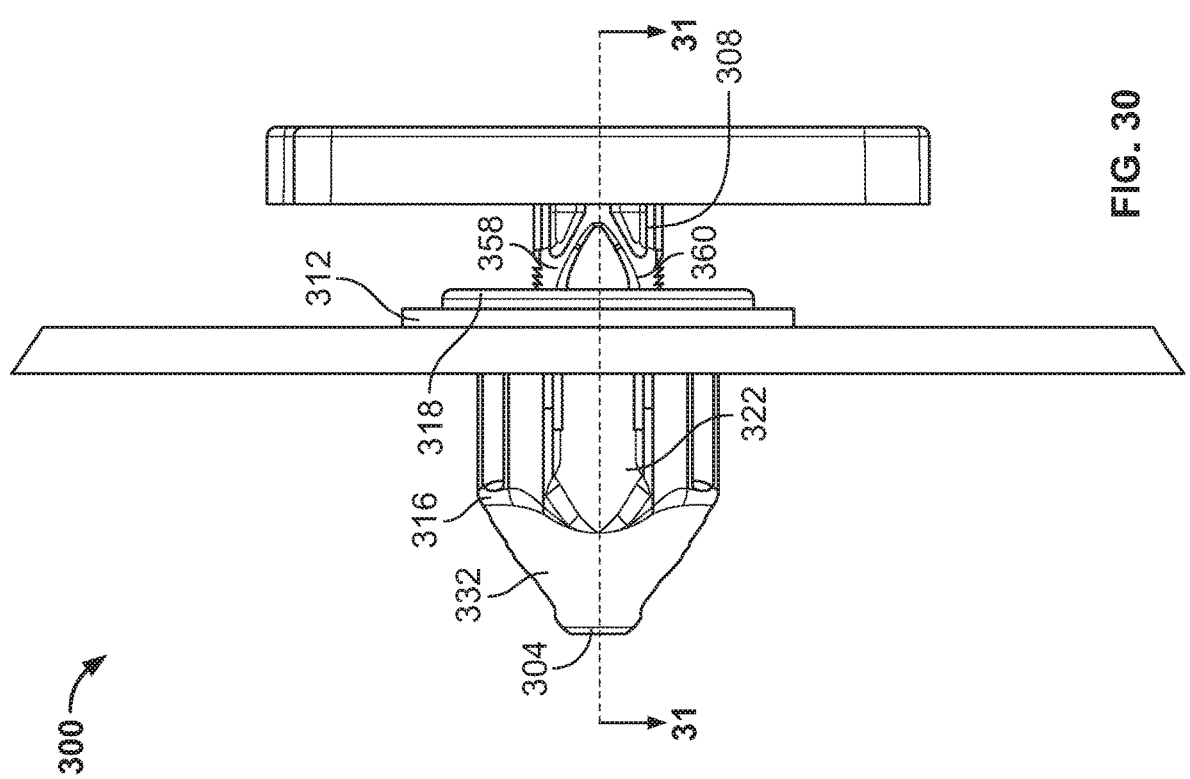

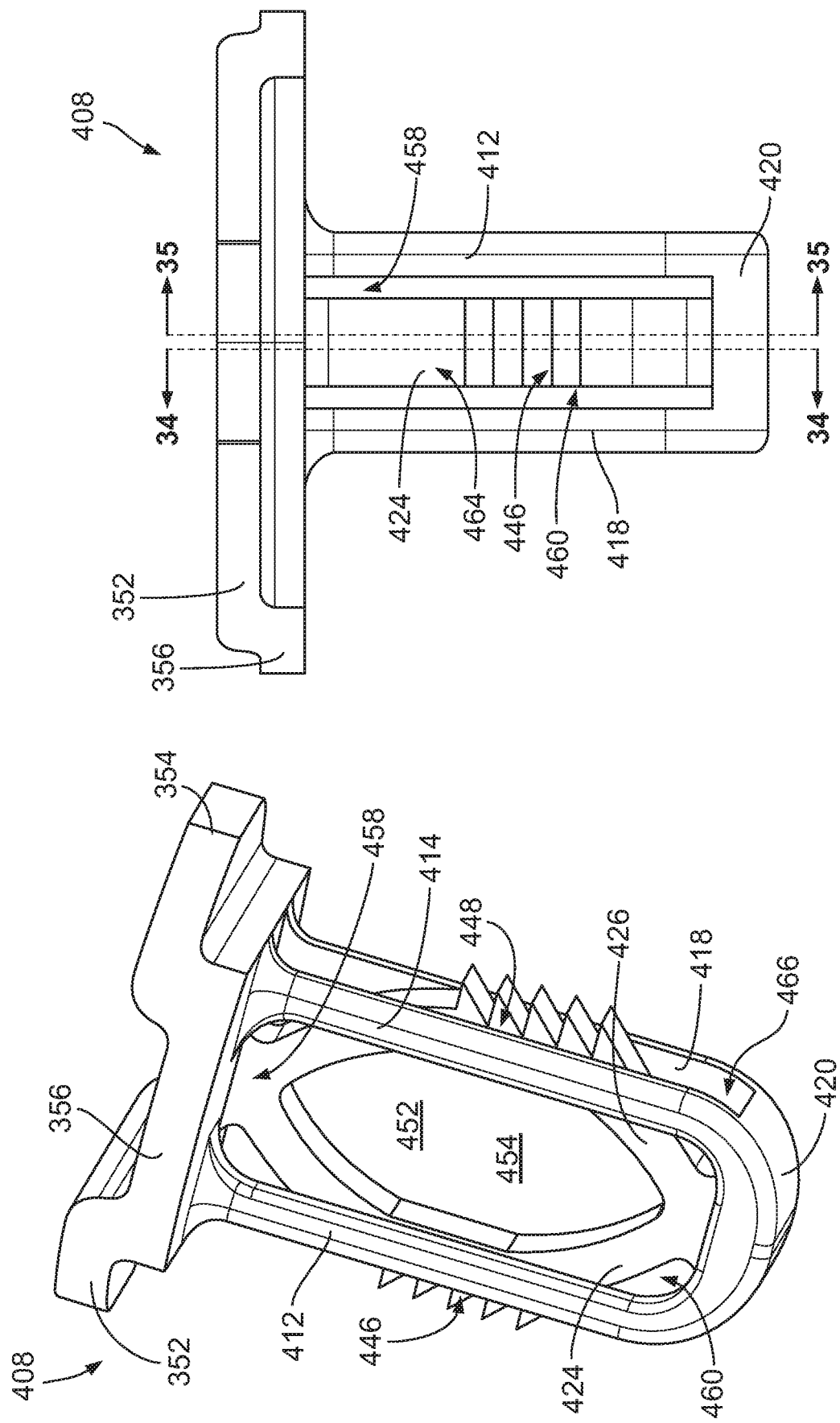

DUAL ENGAGEMENT FASTENER

RELATED APPLICATIONS

The present application claims priority to U.S. Provisional Application Ser. No. 62/828,639 filed on Apr. 3, 2019 and U.S. Provisional Application Ser. No. 62/886,156 filed on Aug. 13, 2019, which are incorporated by reference in their entireties herein.

FIELD OF THE DISCLOSURE

Embodiments of the present disclosure generally relate to vehicle panel components, and, more particularly, to a dual engagement fastener.

BACKGROUND

In recent years, fasteners have been developed to join vehicle panels. Certain known fasteners (e.g., rivets, bolts, screws, etc.) are inserted through first and second panels to hold the panels together. In some instances, opposing ends of these known fasteners engage opposing outer surfaces of the panels. In some instances, an end of these known fasteners threads into one of the panels.

However, these known fasteners require multiple steps to join panels together. Further, aligning the panels to specific tolerances using these known fasteners is often difficult. Therefore, a need exists for a fastener that is simple to install and aids in aligning panels to desired tolerances between the panels.

SUMMARY

In one aspect, an example fastener assembly includes an insert and a base. The insert has a first plurality of teeth. The base defines a cavity to receive the insert and includes a second plurality of teeth to engage with the first plurality of teeth.

In another aspect, an example fastener assembly includes an insert, a base, and gasket. The insert has a first plurality of teeth. The base has a body and a flange. The body has a second plurality of teeth to engage with the first plurality of teeth and defines a cavity to receive the insert. The flange extends radially outwardly from the body. The gasket is engaged with the flange.

In yet another aspect, an example fastener includes an insert and a base. The insert has a first plurality of teeth. The base has an end wall, a gripping leg, a rib, and a second plurality of teeth. The gripping leg is pivotably connected to the end wall. The rib is connected to the gripping leg via the end wall. The second plurality of teeth extends from the gripping leg to engage with the first plurality of teeth.

BRIEF DESCRIPTION OF THE DRAWINGS

FIG. 21 is an isometric exploded view of the second example fastener assembly of FIG. 20;

FIG. 30 is another side view of the second example fastener assembly of FIGS. 20-29 installed with the first and second panels of FIGS. 8-19, 28, and 29;

FIG. 31 is a cross-sectional view of the second example fastener assembly of FIGS. 20-30 installed with the first and second panels of FIGS. 8-19 and 28-30 taken along line 31-31 of FIG. 30

FIG. 32 is an isometric view of a third example insert;

FIG. 33 is a side view of the third example insert of FIG. 31;

DETAILED DESCRIPTION

Embodiments of the present disclosure provide a fastener that may be installed to join panels together with fewer steps than known fasteners and aids in aligning the panels to desired tolerances between the panels.

A first example fastener assembly 100 according to an embodiment of the present disclosure is depicted in FIGS. 1-19. With reference to FIGS. 1-10, 12-16, 18, and 19 the first example fastener assembly 100 includes a first example base 104, a first example insert 108, and a gasket 112. In some embodiments, the base 104 and the insert 108 are formed of a thermoplastic polymer (e.g., polyoxymethylene (POM) or nylon). In some embodiments, the thermoplastic polymer is infused with glass fibers. In some embodiments, the gasket 112 is formed of a thermoplastic elastomer (TPE).

Figure 5:
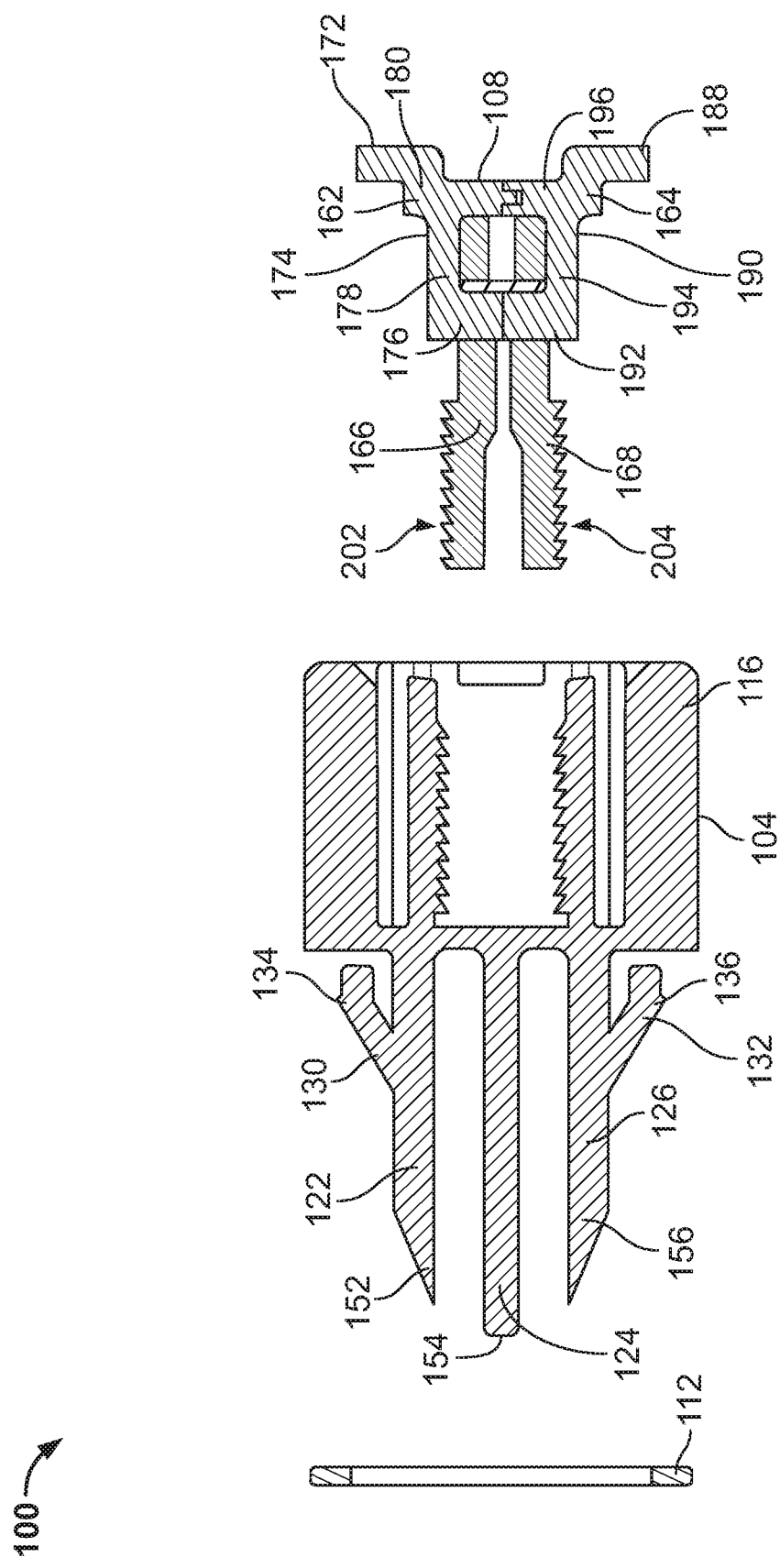
FIG. 5 is an exploded cross-sectional view of the first example fastener assembly of FIGS. 1-4 taken along line 5-5 of FIG. 4.
Figure 6:
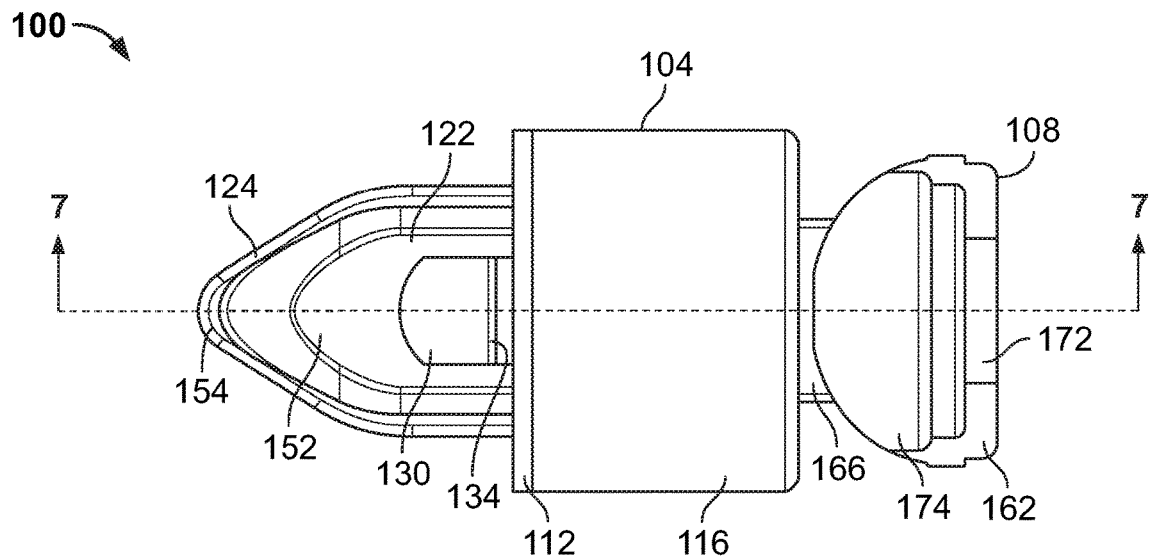
FIG. 6 is a side view of the first example fastener assembly of FIGS. 1-5.
Figure 7:
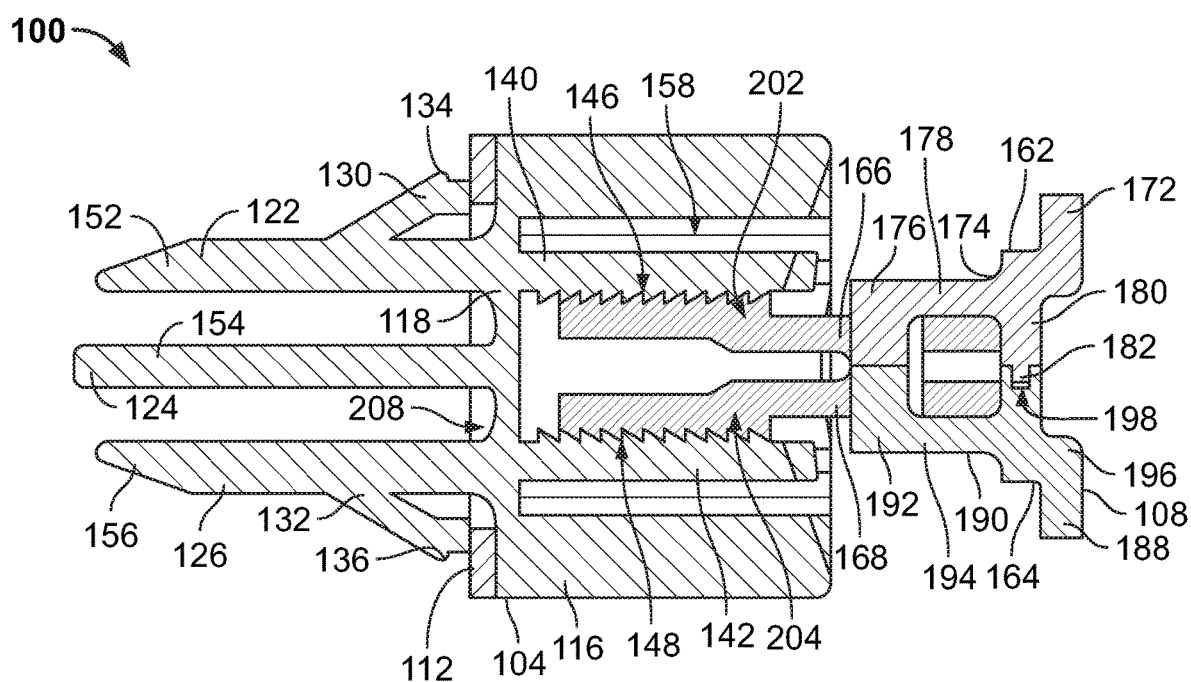
FIG. 7 is a cross-sectional view of the first example fastener assembly of FIG. 1-6 taken along line 7-7 of FIG. 6.
Figure 9:
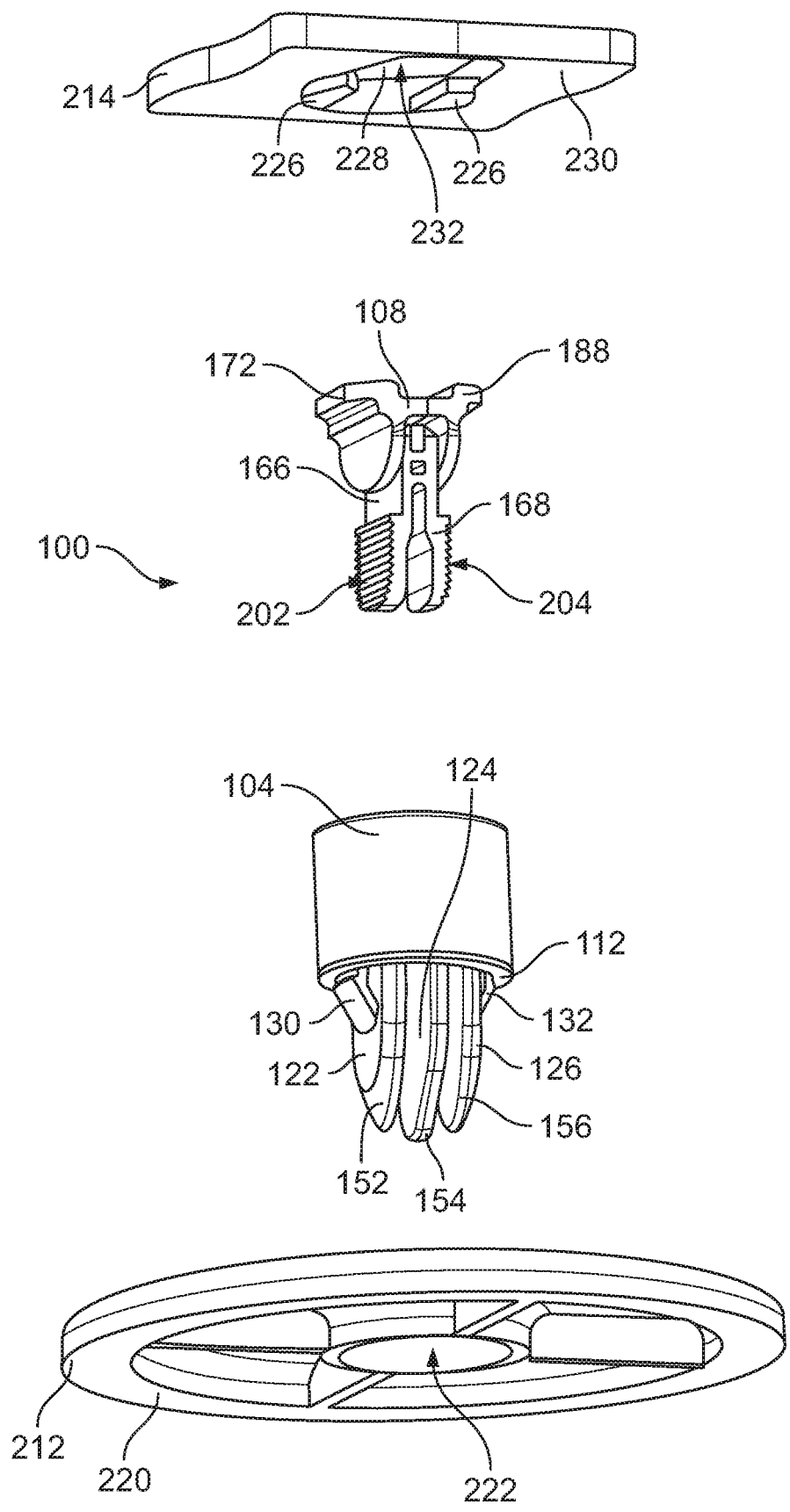
FIG. 9 is another isometric exploded view of the first example fastener assembly of FIGS. 1-8 before installation with the first panel and the second panel of FIG. 8.
Figure 19:
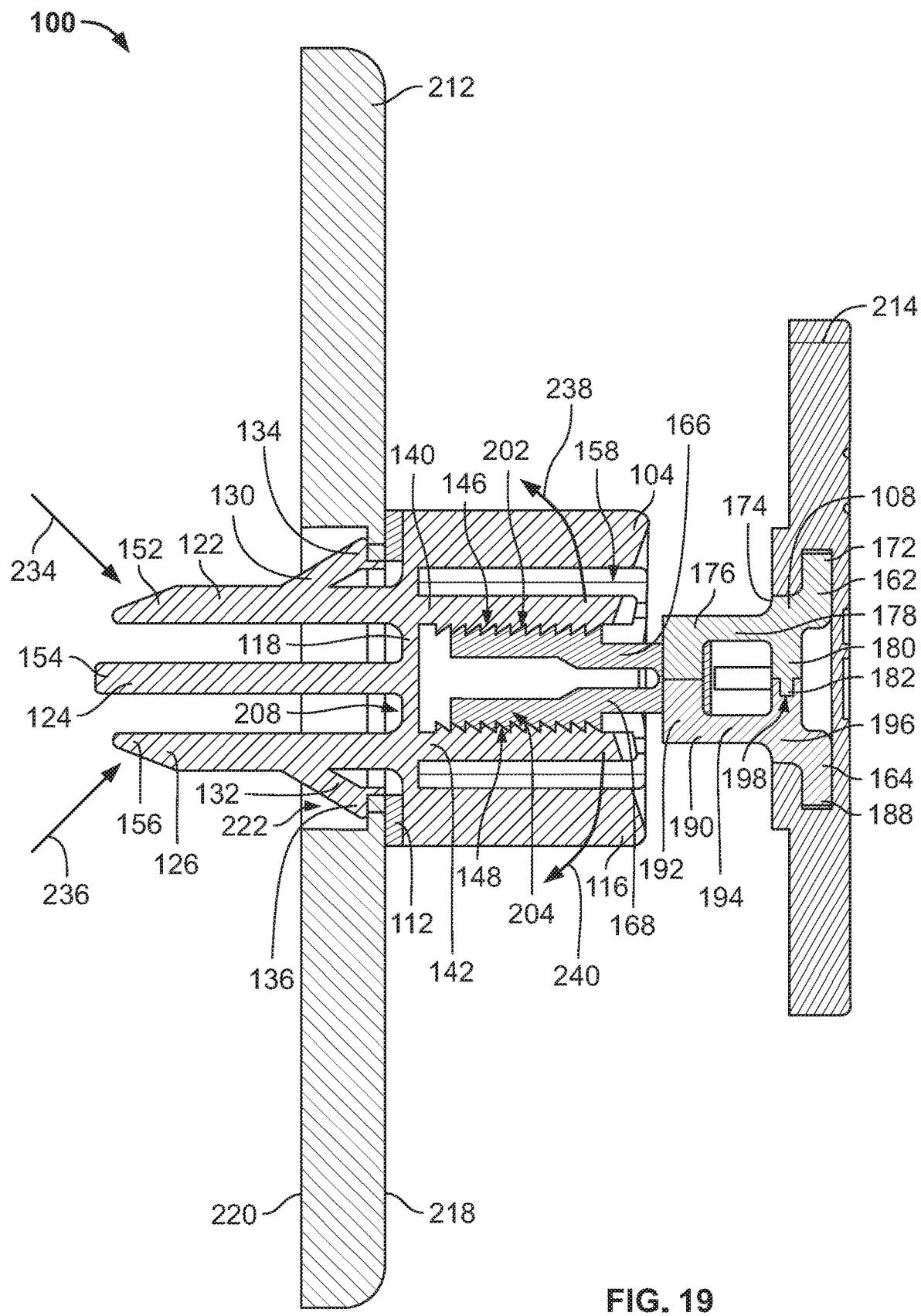
FIG. 19 is a cross-sectional view of the first example fastener assembly of FIGS. 17 and 18 installed with the first panel and the second panel of FIGS. 8-17 taken along line 19-19 of FIG. 18.
Figure 20:
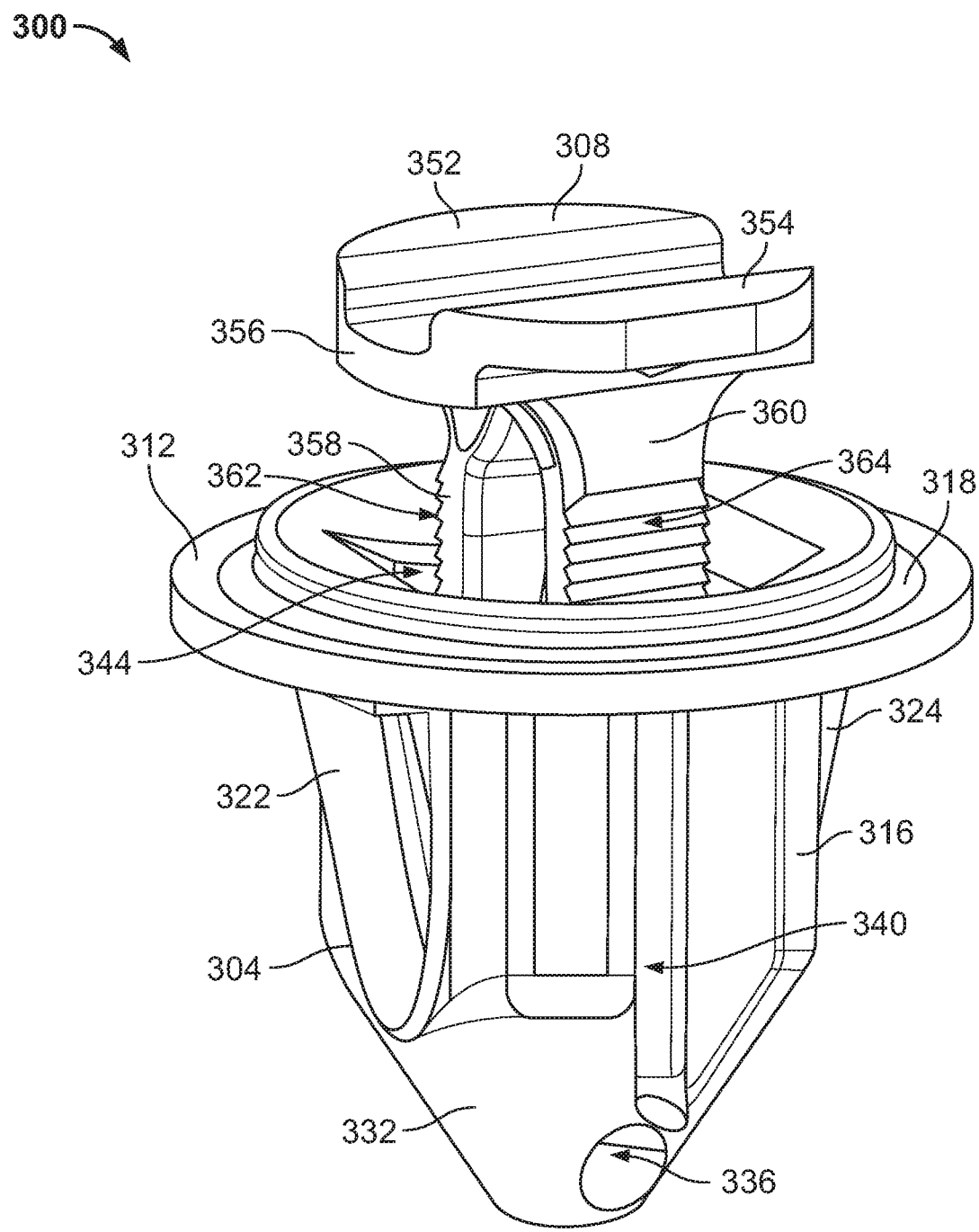
FIG. 20 is an isometric view of a second example fastener assembly according to an embodiment of the present disclosure.

With reference to FIGS. 5, 7, and 19, the base 104 includes a cylindrical wall 116, an end wall 118, a first rib 122, a second rib 124, a third rib 126, a first snap wing 130, and a second snap wing 132. The first snap wing 130 includes a first shoulder 134. The first shoulder 134 extends radially outwardly. The second snap wing 132 includes a second shoulder 136. The second shoulder 136 extends radially outwardly. The base 104 further includes a first gripping leg 140 and a second gripping leg 142. The first gripping leg 140 includes a first plurality of teeth 146. The first plurality of teeth 146 extend radially inwardly. The second gripping leg 142 includes a second plurality of teeth 148. The second plurality of teeth 148 extend radially inwardly. The first plurality of teeth 146 face the second plurality of teeth 148. With reference to FIG. 6, the first rib 122 includes a first acute tip 152. The second rib 124 includes a second acute tip 154. With reference to FIG. 9, the third rib 126 includes a third acute tip 156. In other words, the first rib 122, the second rib 124, and the third rib 126 are tapered. The cylindrical wall 116 and the end wall 118 define a cavity 158. The first gripping leg 140 and the second gripping leg 142 are disposed in the cavity 158.

With reference to FIGS. 5, 7, and 19, the insert 108 includes a first mount 162, a second mount 164, a third gripping leg 166, and a fourth gripping leg 168. With reference to FIGS. 7 and 19, the first mount 162 includes a first flange 172 and a first U-shaped connector 174. The first U-shaped connector 174 includes a first connector wall 176, a second connector wall 178, a third connector wall 180, and a key 182. The second mount 164 includes a second flange 188 and a second U-shaped connector 190. The second U-shaped connector 190 includes a fourth connector wall 192, a fifth connector wall 194, a sixth connector wall 196, and a notch 198. The key 182 fits into the notch 198 to secure the first mount 162 to the second mount 164. The third gripping leg 166 includes a third plurality of teeth 202. The third plurality of teeth 202 extend radially outwardly. The fourth gripping leg 168 includes a fourth plurality of teeth 204. The fourth plurality of teeth 204 extend radially outwardly.

Figure 1:
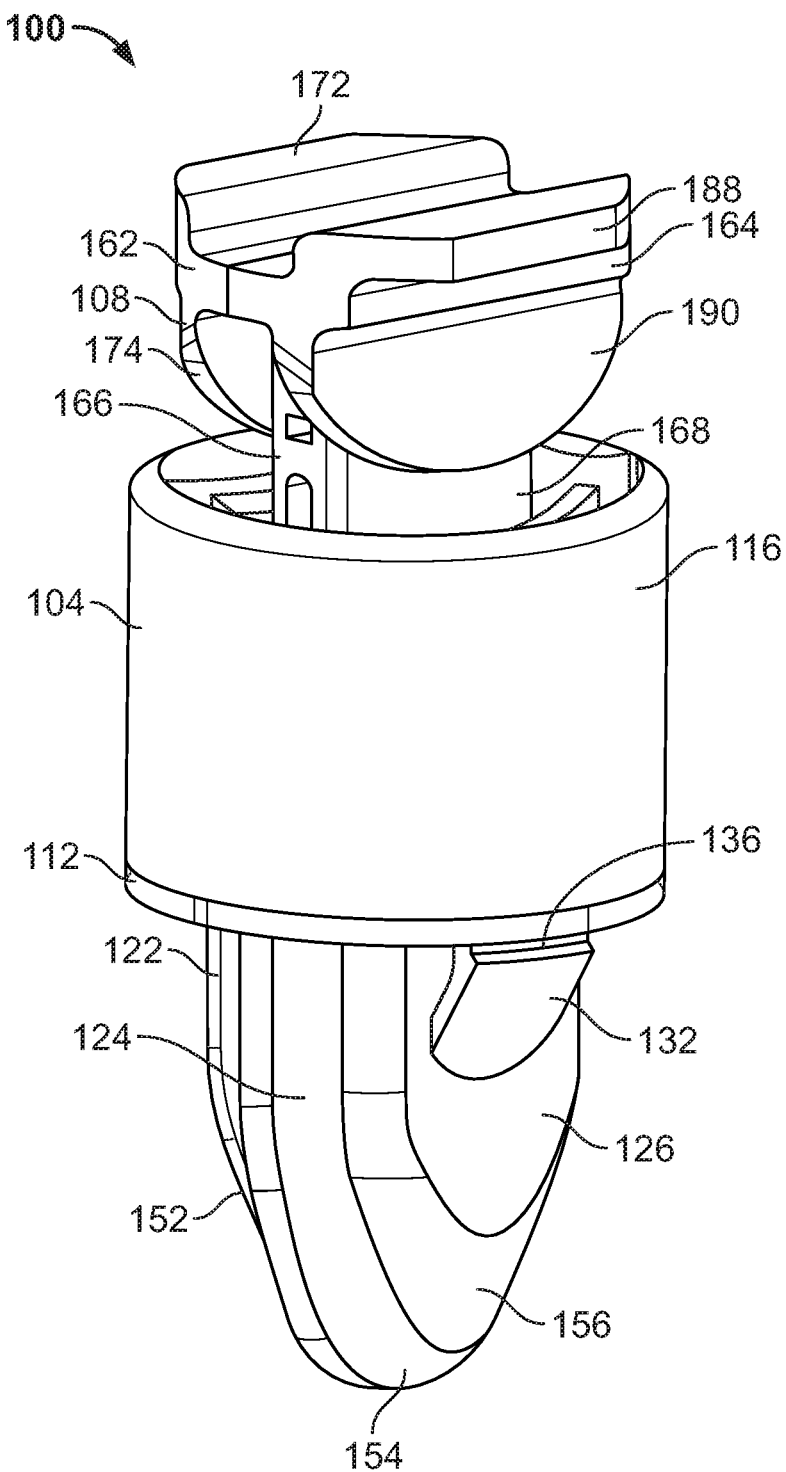
FIG. 1 is an isometric view of a first example fastener assembly according to an embodiment of the present disclosure.
Figure 2:
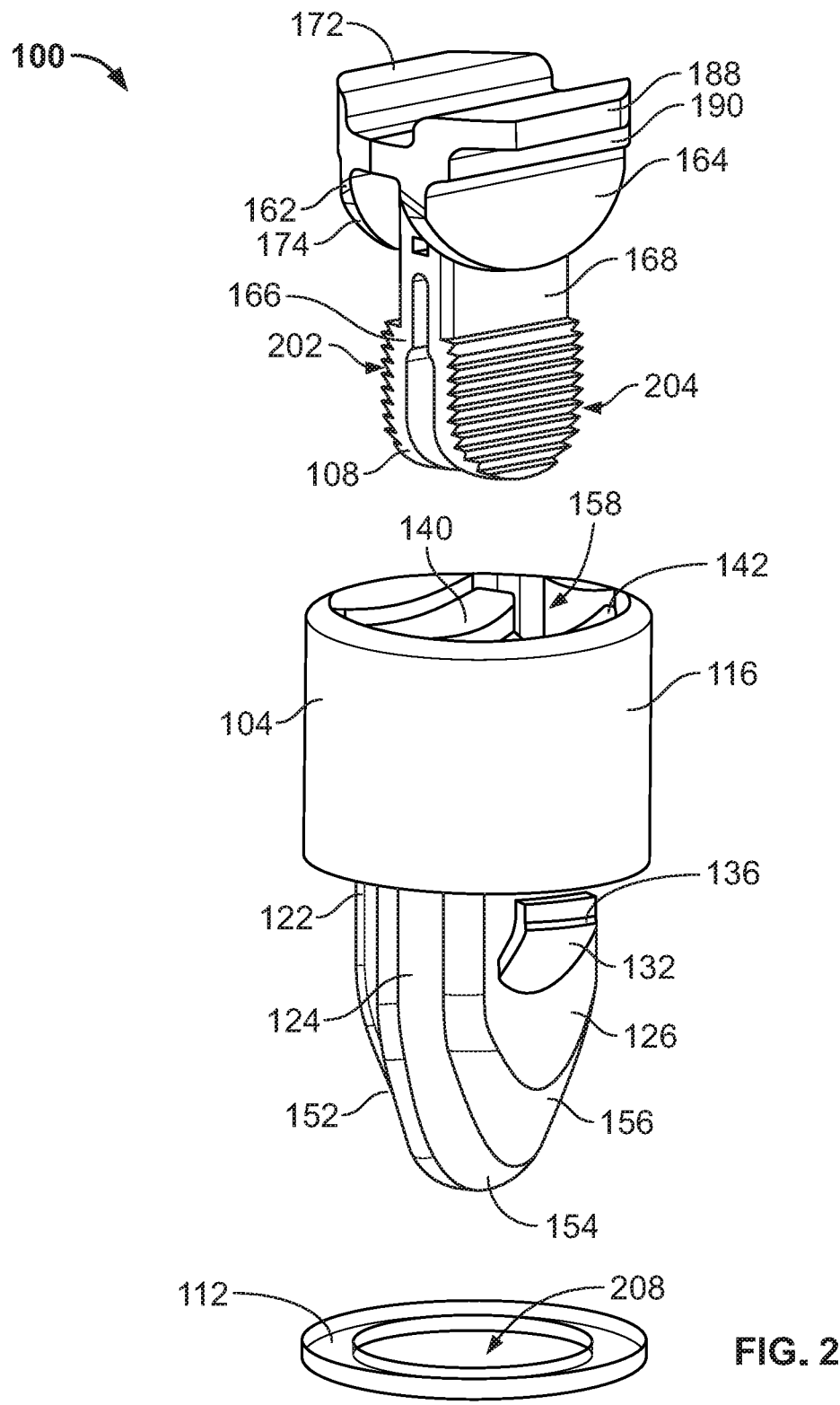
FIG. 2 is an isometric exploded view of the first example fastener assembly of FIG. 1.
Figure 3:
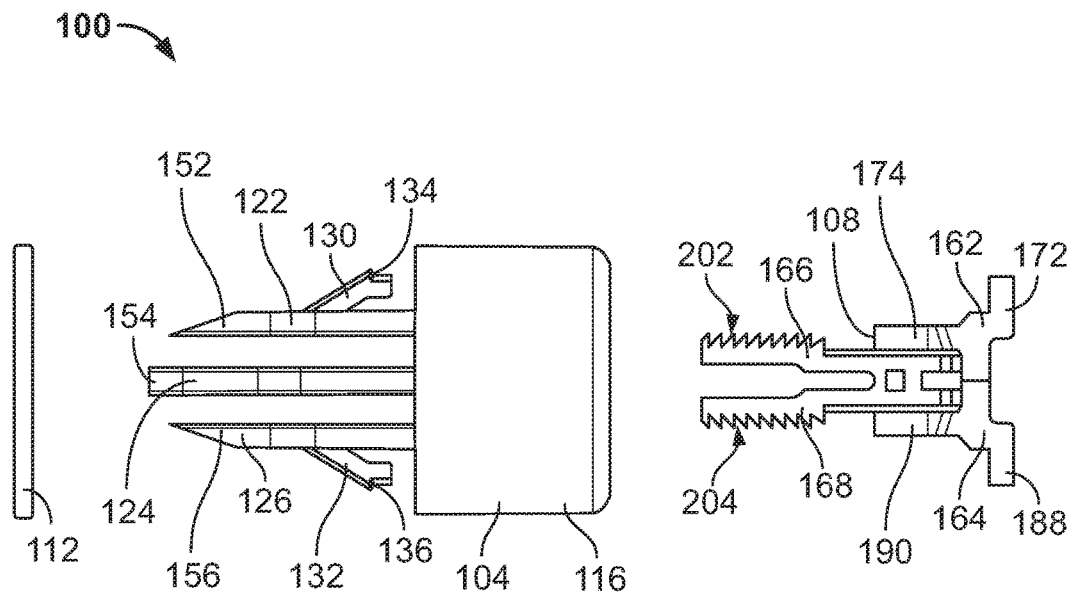
FIG. 3 is a side exploded view of the first example fastener assembly of FIGS. 1 and 2.
Figure 4:
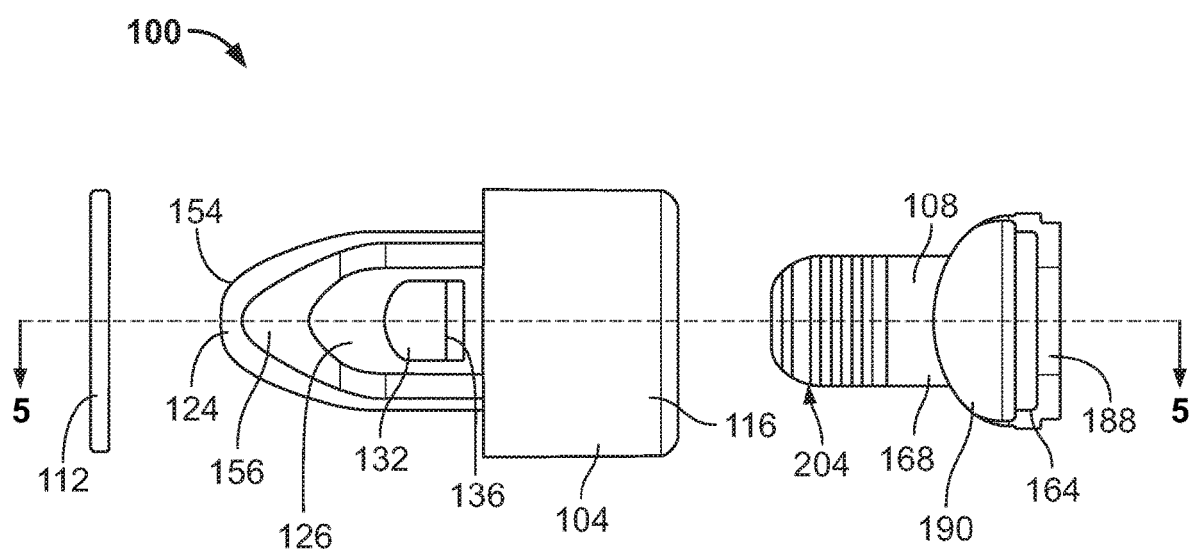
FIG. 4 is another side exploded view of the first example fastener assembly of FIGS. 1-3.

With reference to FIG. 2, the gasket 112 is annular and defines an opening 208.

Figure 8:
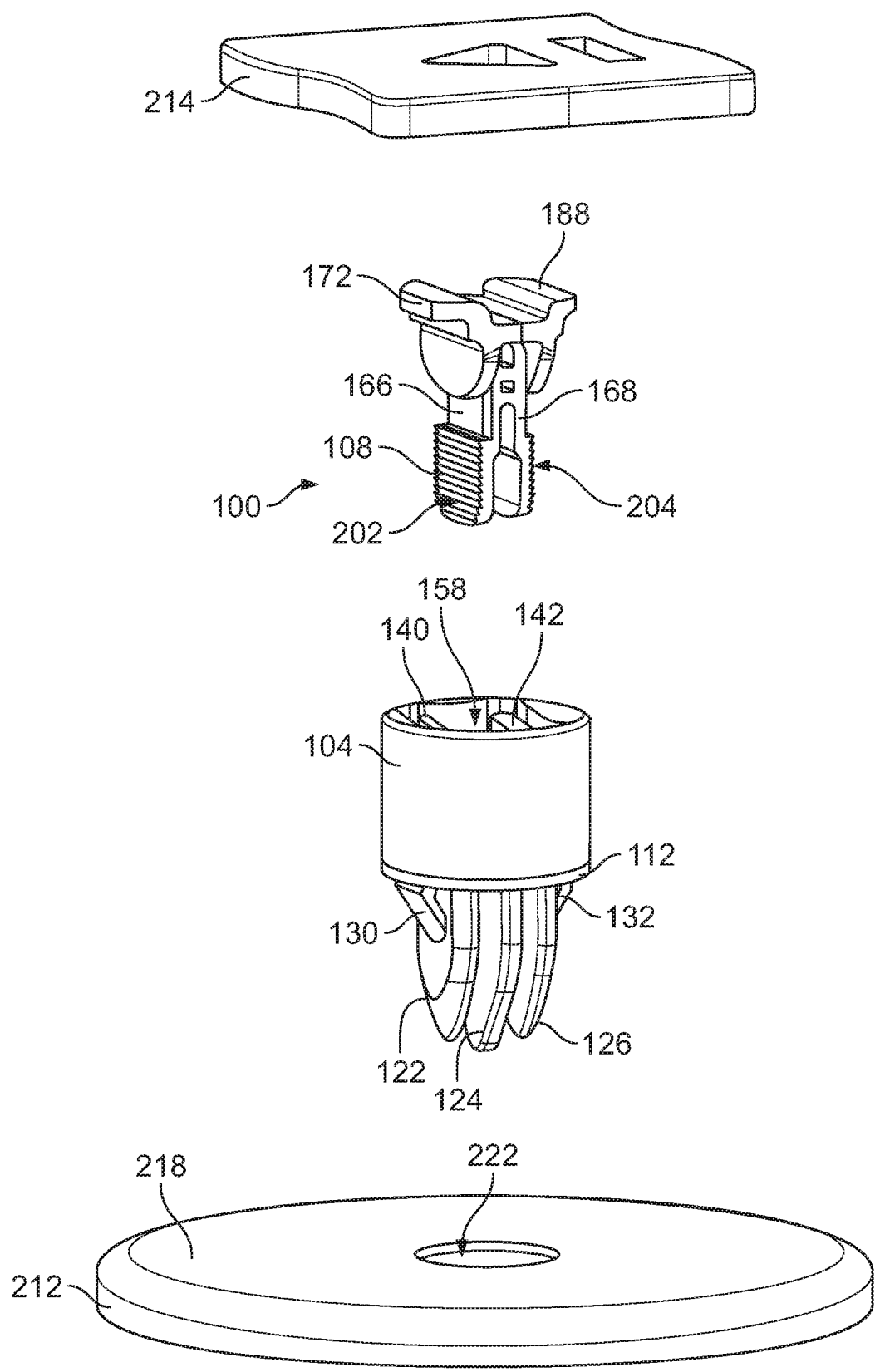
FIG. 8 is an isometric exploded view of the first example fastener assembly of FIGS. 1-7 before installation with a first panel and a second panel.

With reference to FIG. 8, the first example fastener assembly 100 operates in conjunction with a first panel 212 (e.g., a vehicle deck lid) and a second panel 214 (e.g., a spoiler). The first panel 212 includes a top side 218. With reference to FIG. 9, the first panel 212 also includes a bottom side 220. The first panel 212 defines an opening 222. The second panel 214 includes mounting tabs 226, a recessed surface 228, and a bottom surface 230. The mounting tabs 226 and the recessed surface define a keyhole slot 232.

With reference to FIGS. 5, 7, and 19, the end wall 118 is connected to the cylindrical wall 116. The first rib 122, the second rib 124, and the third rib 126 are connected to and extend from the end wall 118. The second rib 124 is between the first rib 122 and the third rib 126. The first gripping leg 140 and the second gripping leg 142 extend from the end wall 118. In other words, the first gripping leg 140 and the second gripping leg 142 are connected to and extend from the end wall 118 opposite the first rib 122, the second rib 124, and the third rib 126. Thus, the first gripping leg 140 and the second gripping leg 142 are pivotable within the cavity 158. The cylindrical wall 116 extends from the end wall 118 opposite the first rib 122, the second rib 124, and the third rib 126. The first rib 122 and the first gripping leg 140 extend from the end wall 118 opposite one another. Thus the first rib 122 and the first gripping leg 140 are connected to one another via the end wall 118. The third rib 126 and the second gripping leg 142 extend from the end wall 118 opposite one another. Thus, the third rib 126 and the second gripping leg 142 are connected to one another via the end wall 118. The first gripping leg 140 and the second gripping leg 142 are disposed in the cylindrical wall 116. The first plurality of teeth 146 faces the second plurality of teeth 148.

The first snap wing 130 is resiliently pivotably connected to and extends diagonally outwardly from the first rib 122 toward the cylindrical wall 116. The second snap wing 132 is resiliently pivotably connected to and extends diagonally outwardly from the third rib 126 toward the cylindrical wall 116.

With reference to FIGS. 5, 7, and 19, the first mount 162 is engaged with the second mount 164. The third gripping leg 166 is engaged with the fourth gripping leg 168. The third gripping leg 166 is resiliently pivotably connected to and extends from the first mount 162. The fourth gripping leg 168 is resiliently pivotably connected to and extends from the second mount 164.

With reference to FIGS. 7 and 19, the first flange 172 is connected to and extends away from the first U-shaped connector 174. More specifically, the first flange 172 extends radially outwardly from the third connector wall 180. The second connector wall 178 is engaged with the first connector wall 176 and the third connector wall 180. The key 182 is connected to and extends from the third connector wall 180 oppositely from the first flange 172.

With reference to FIGS. 7 and 19, the second flange 188 is connected to and extends away from the second U-shaped connector 190. More specifically, the second flange 188 extends radially outwardly from the sixth connector wall 196. The fifth connector wall 194 is engaged with the fourth connector wall 192 and the sixth connector wall 196. The sixth connector wall 196 defines the notch 198.

With reference to FIGS. 7 and 19, the third plurality of teeth 202 and the fourth plurality of teeth 204 face outwardly. The third plurality of teeth 202 and the fourth plurality of teeth 204 are opposite one another. With reference to FIG. 7 the first plurality of teeth 146 and the third plurality of teeth 202 ratchetingly engage one another. Further, the second plurality of teeth 148 and the fourth plurality of teeth 204 ratchetingly engage one another.

With reference to FIGS. 1, 6, 7, and 12-19, the insert 108 is configured to be inserted into the base 104. With reference to FIGS. 1, 7, and 12-19, the gasket 112 is configured to engage the base 104 about the first rib 122, the second rib 124, and the third rib 126. Thus, the first rib 122, the second rib 124, and the third rib 126 extend through the gasket 112.

With reference to FIGS. 7 and 19, the first plurality of teeth 146 complement the third plurality of teeth 202. The second plurality of teeth 148 complement the fourth plurality of teeth 204. In operation, when the insert 108 is pushed into the cavity 158 between the first gripping leg 140 and the second gripping leg 142, the first gripping leg 140 and the second gripping leg 142 resiliently bend away from and snappingly return to one another. Further in operation, as the insert 108 is pushed between the first gripping leg 140 and the second gripping leg 142, the first plurality of teeth 146 ratchetingly engage the third plurality of teeth 202. Additionally in operation, as the insert 108 is pushed between the first gripping leg 140 and the second gripping leg 142, the second plurality of teeth 148 ratchetingly engage the fourth plurality of teeth 204. Thus, the insert 108 is retained in the base 104 via the first plurality of teeth 146, the second plurality of teeth 148, the third plurality of teeth 202, and the fourth plurality of teeth 204. In other words, the insert 108 is received in the cavity 158 defined by the base 104.

Figure 10:
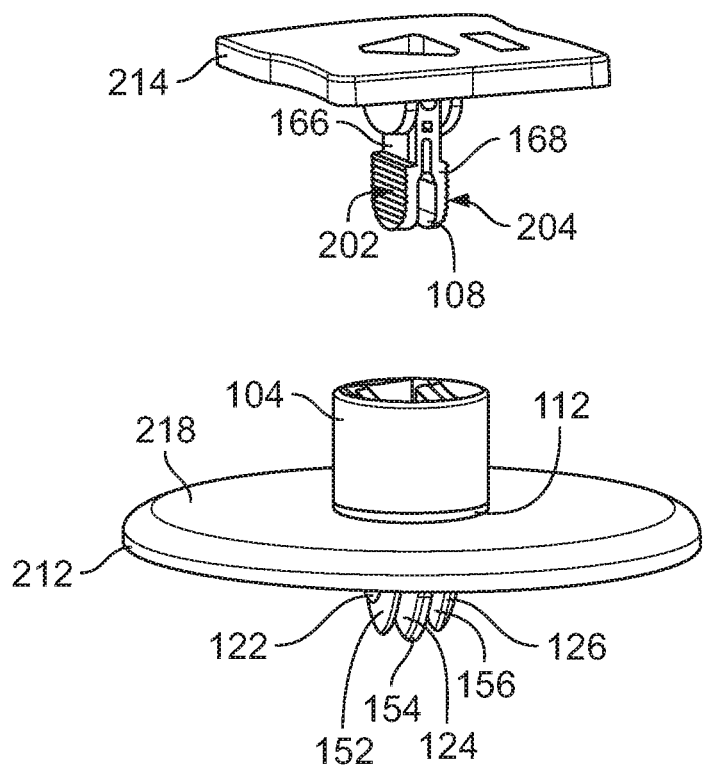
FIG. 10 is an isometric view of a first example base of the first example fastener assembly of FIGS. 1-9 installed in the first panel of FIGS. 8 and 9 and a first example insert of the first example fastener assembly of FIGS. 1-9 installed in the second panel of FIGS. 8 and 9 before installation of the first example insert into the base.
Figure 11:
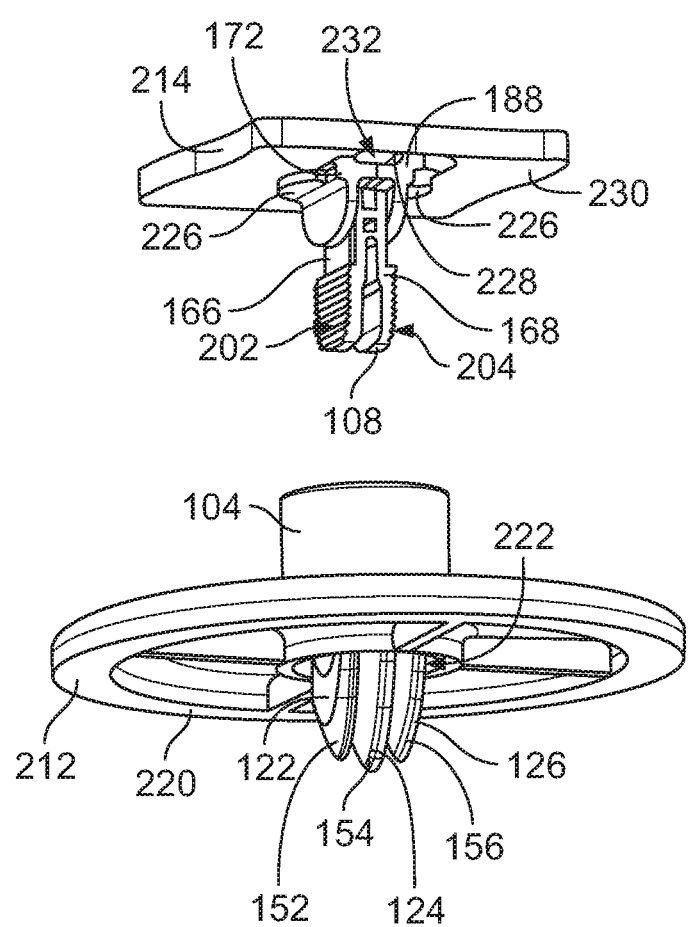
FIG. 11 is another isometric view of the first example base of FIG. 10 installed in the first panel of FIGS. 8-10 and the insert of FIG. 10 installed in the second panel of FIGS. 8-10 before installation of the insert into the base.
Figure 16:
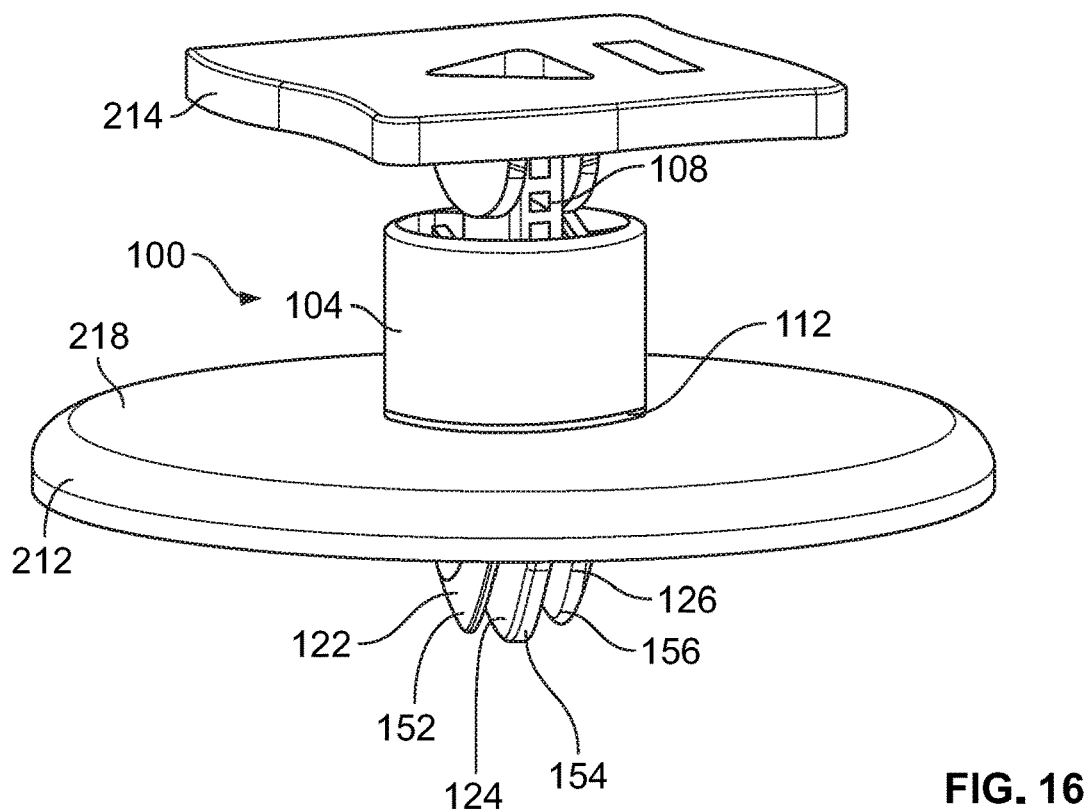
FIG. 16 is an isometric view of the first example fastener assembly of FIGS. 1-15 installed with the first panel and the second panel of FIGS. 8-15.
Figure 17:
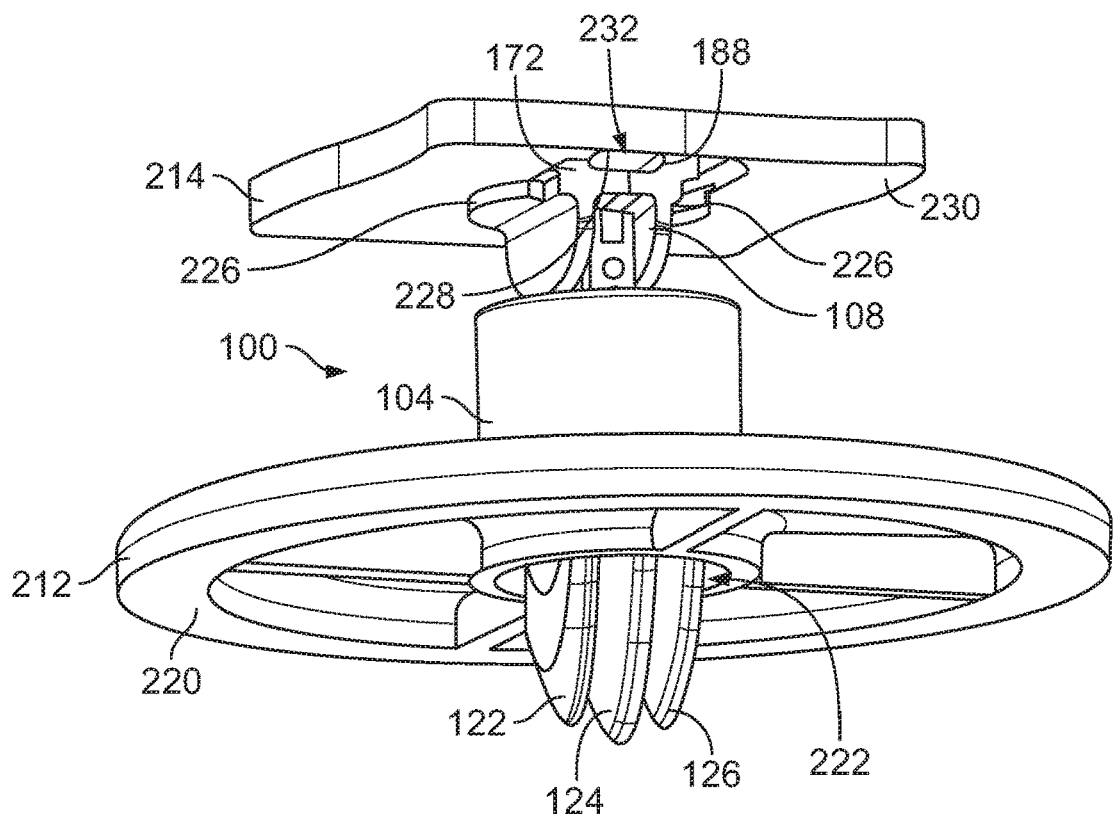
FIG. 17 is another isometric view of the first example fastener assembly of FIGS. 1-16 installed with the first panel and the second panel of FIGS. 8-16.
Figure 18:
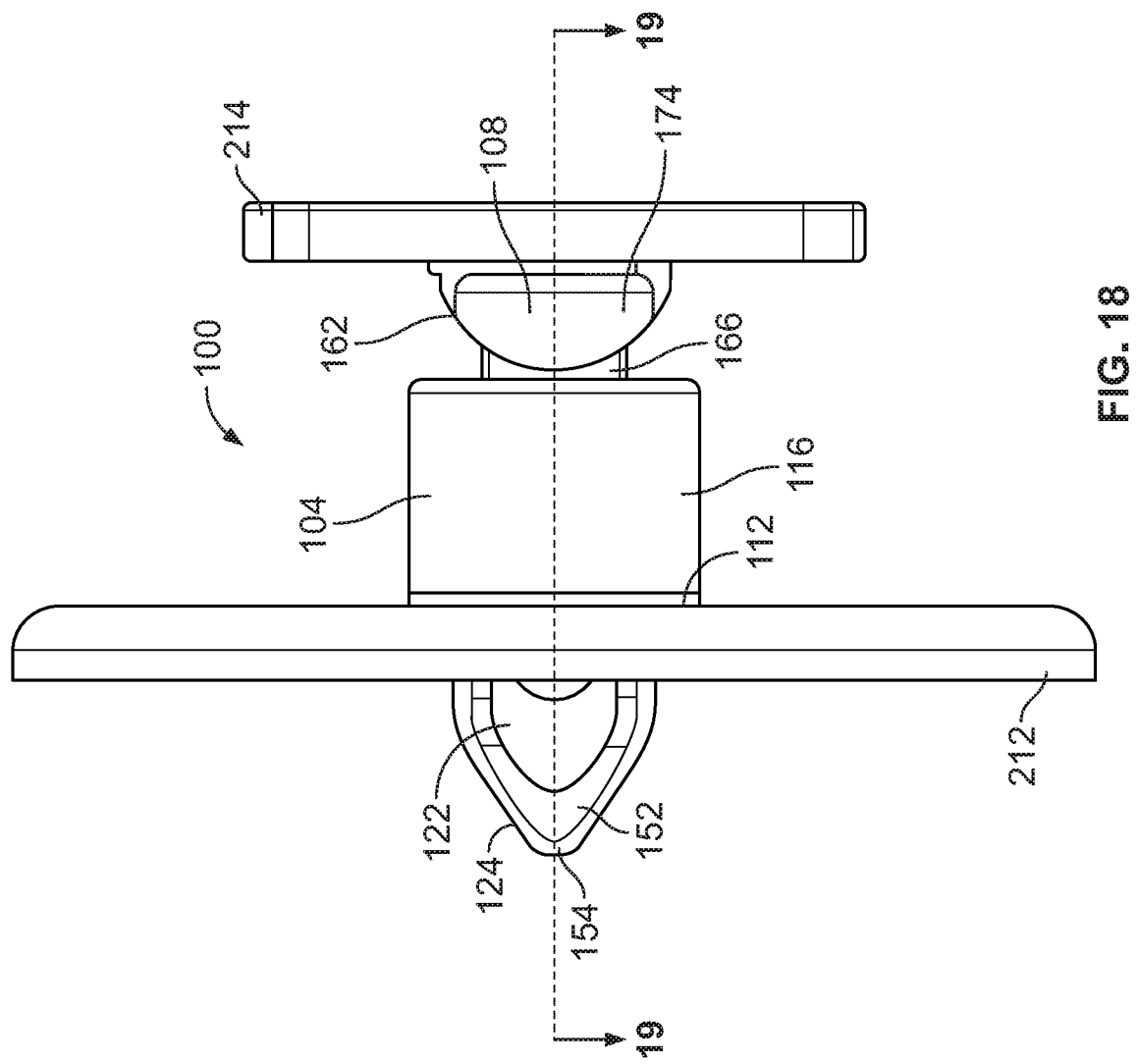
FIG. 18 is a side view of the first example fastener assembly of FIGS. 1-17 installed with the first panel and the second panel of FIGS. 8-16.

With reference to FIGS. 10 and 11, in operation, to assemble the first example fastener assembly 100 with the first panel 212 and the second panel 214, in some instances, the base 104 may initially be assembled with the first panel 212 and the insert 108 may initially be assembled with the second panel 214. With reference to FIG. 10, when the base 104 is inserted into the first panel 212, the gasket 112 is captured between the base 104 and the top side 218. With reference to FIG. 11, it should be appreciated that the first rib 122, the second rib 124, and the third rib 126 guide insertion of the base 104 through the opening 222. More specifically, the first acute tip 152, the second acute tip 154, and the third acute tip 156 act as lead-features to ease insertion of the base 104 into the opening 222. With reference to FIGS. 16 and 17, the insert 108 may subsequently be inserted into the base 104 to fasten the second panel 214 to the first panel 212.

Figure 12:
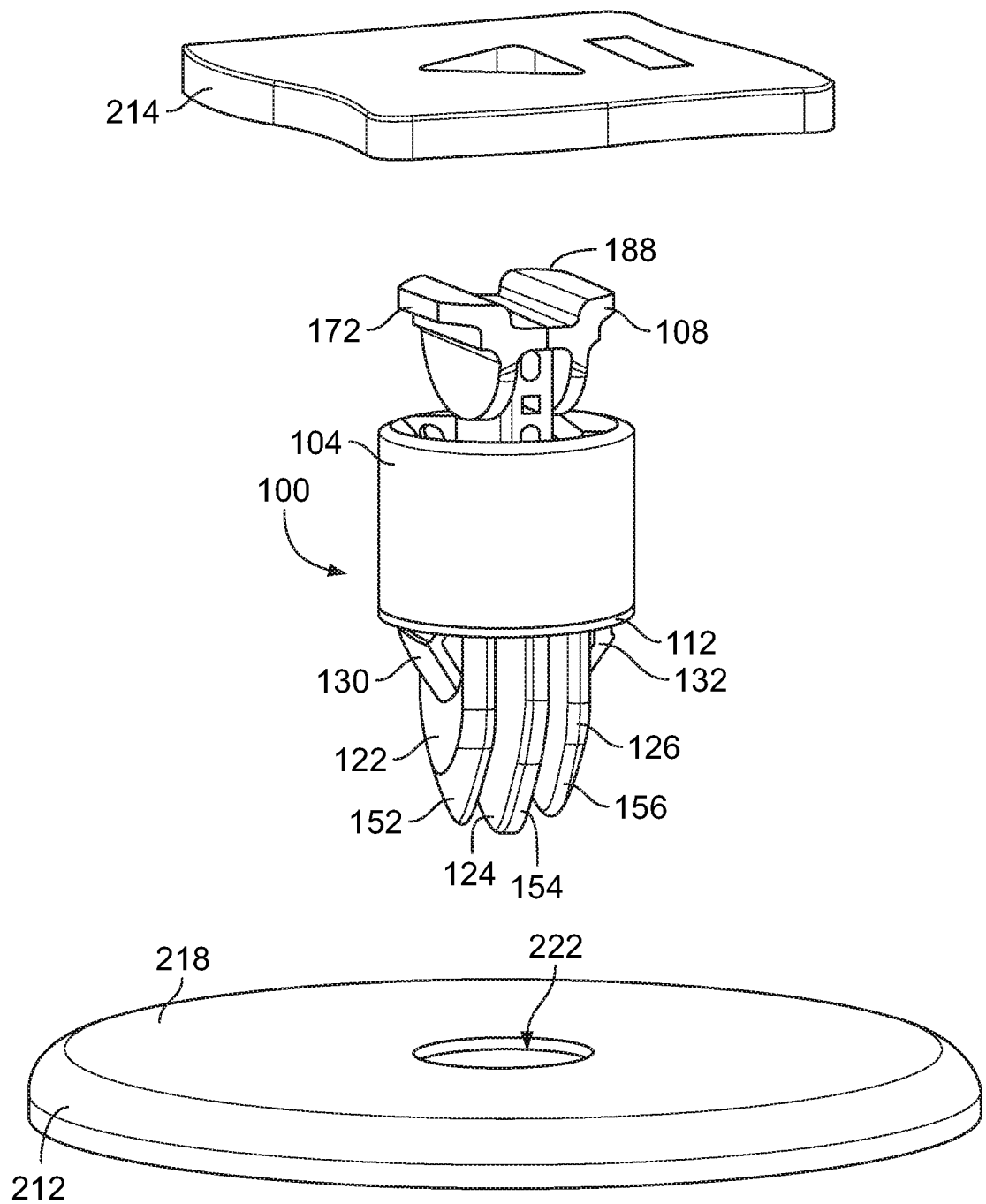
FIG. 12 is an isometric view of the first example fastener assembly of FIGS. 1-11 assembled together before installation with the first panel and the second panel of FIGS. 8-11.
Figure 13:
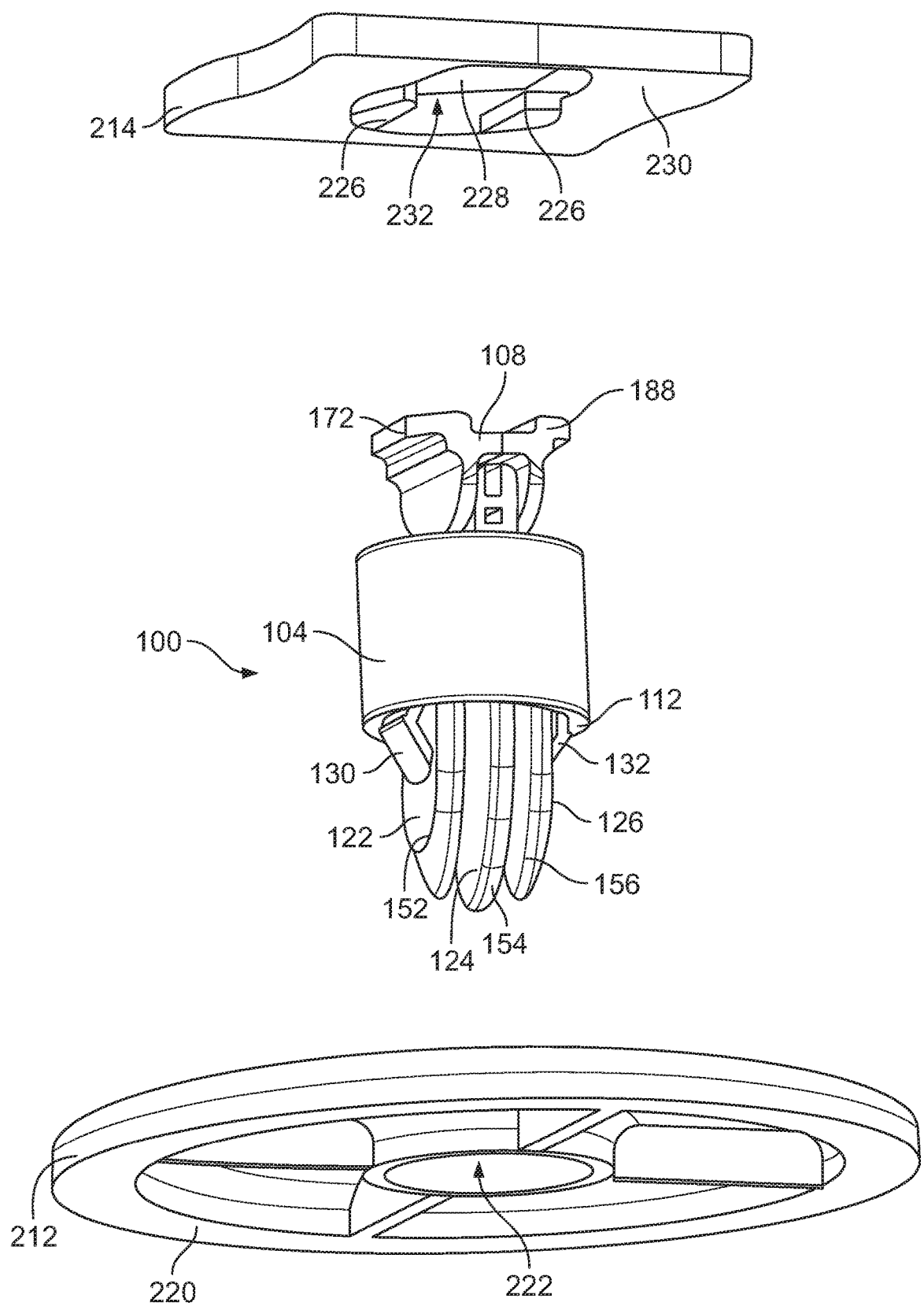
FIG. 13 is another isometric view of the first example fastener assembly of FIGS. 1-12 assembled together before installation with the first panel and the second panel of FIGS. 8-12.
Figure 14:
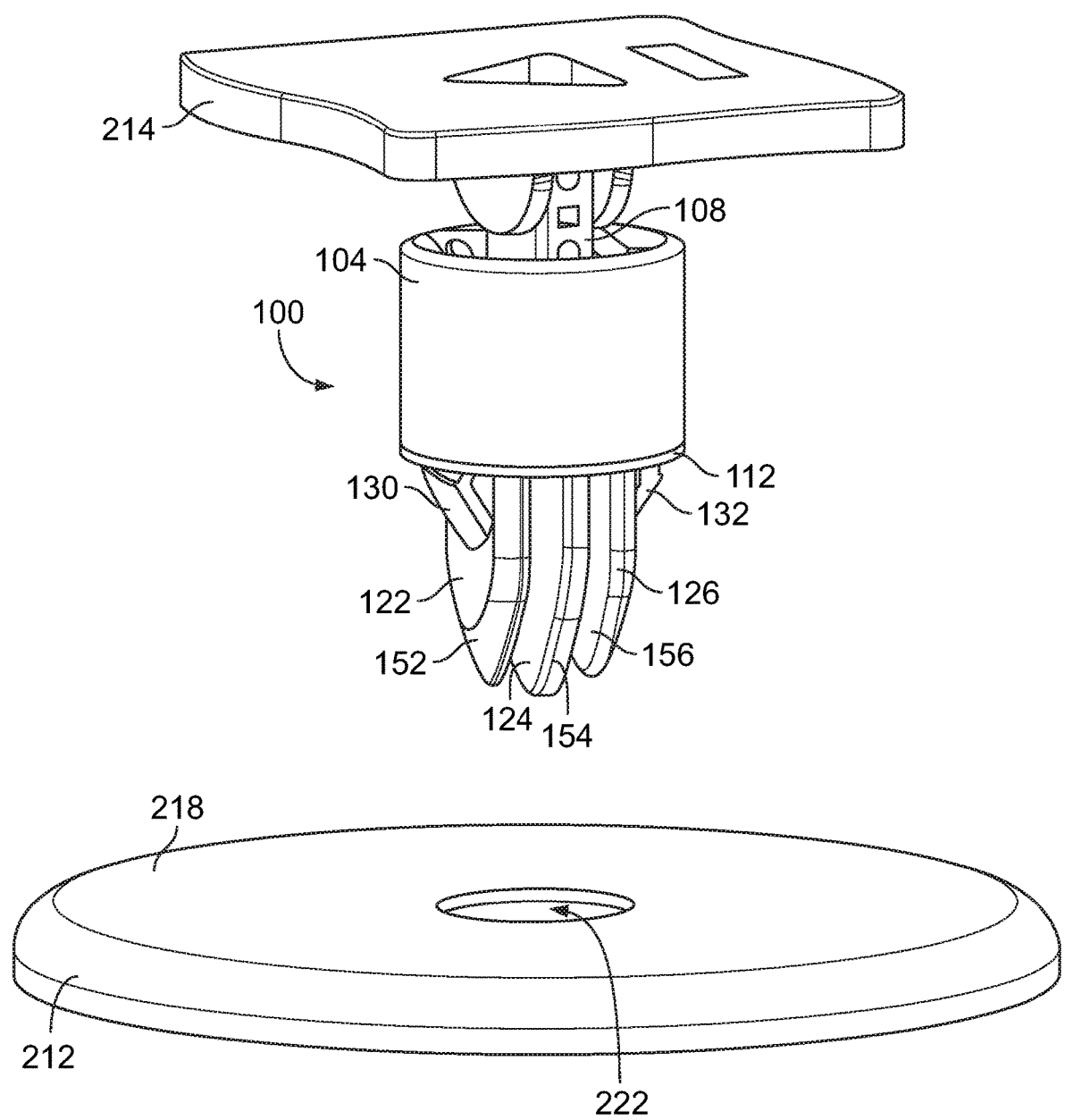
FIG. 14 is an isometric view of the first example fastener assembly of FIGS. 1-13 installed in the second panel of FIGS. 8-13 before installation with the first panel of FIGS. 8-13.
Figure 15:
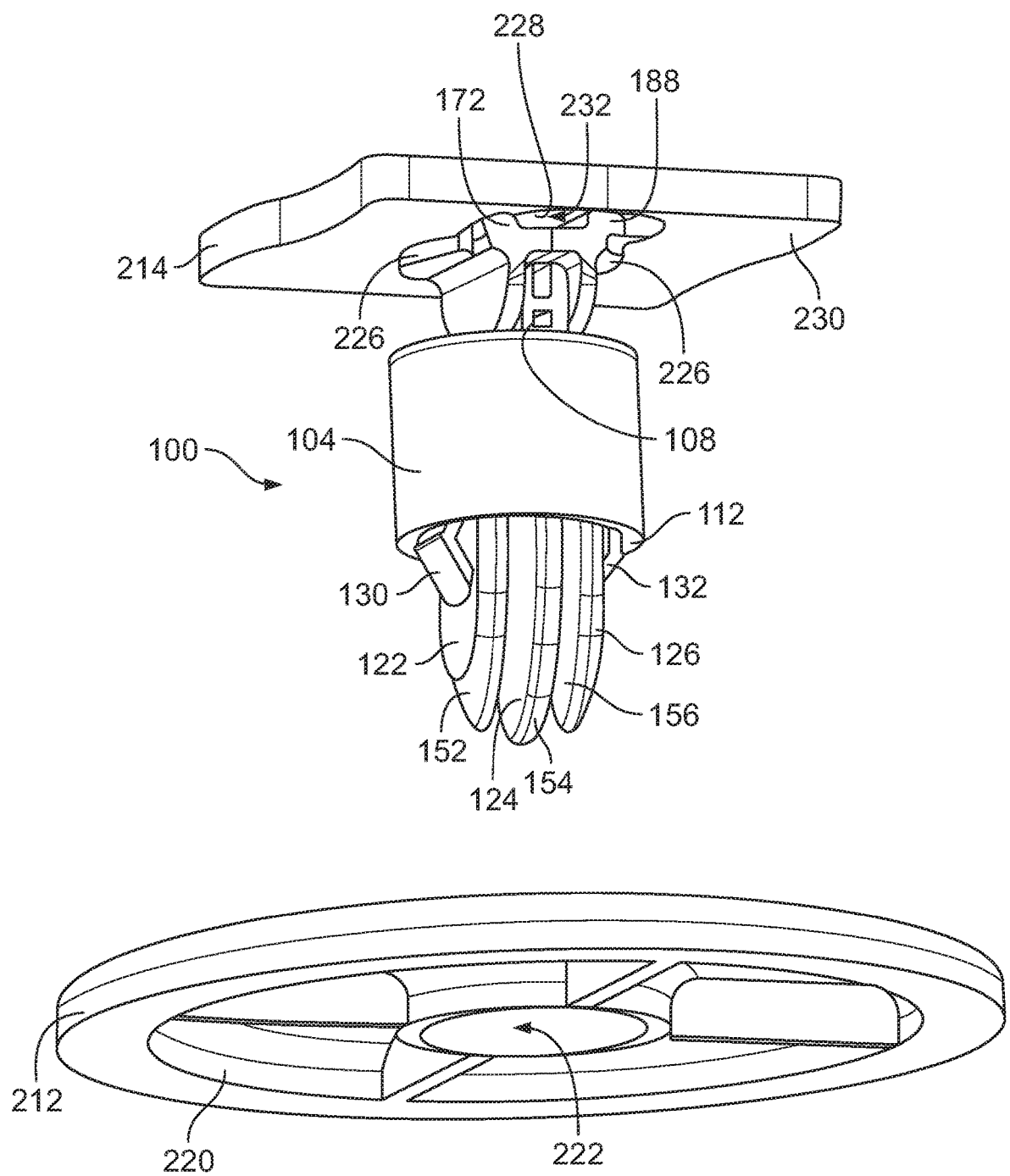
FIG. 15 is another isometric view of the first example fastener assembly of FIGS. 1-14 installed in the second panel of FIGS. 8-14, before installation with the first panel of FIGS. 8-14.

With reference to FIGS. 12 and 13, in operation, to assemble the first example fastener assembly 100 with the first panel 212 and the second panel 114, in some instances, the insert 108 may initially be inserted into the base 104. With reference to FIGS. 14 and 15, the insert 108 may subsequently be mounted to the second panel 214. When the insert 108 is mounted to the second panel 214, the first flange 172 and the second flange 188 are disposed in the keyhole slot 232 to engage the mounting tabs 226 and the recessed surface 228. With reference to FIG. 17, the base 104 may subsequently be mounted to the first panel 212.

With reference to FIG. 19, in operation, to mount the base 104 to the first panel 212, the first snap wing 130 and the second snap wing 132 are pushed through the opening 222. As the first snap wing 130 and the second snap wing 132 pass through the first panel 212 from the top side 218 to the bottom side 220 via the opening 222, the first snap wing 130 and the second snap wing 132 flex inwardly toward one another. When the first snap wing 130 and the second snap wing 132 exit the opening 222 at the bottom side 220, the first snap wing 130 and the second snap wing 132 rebound outwardly relative to one another to engage the first shoulder 134 and the second shoulder 136 with the bottom side 220. Thus, when the first example fastener assembly 100 is mounted to the first panel 212, the first snap wing 130 and the second snap wing 132 snapably engage the first panel 212.

With reference to FIG. 19, in operation, the first rib 122 may be pushed in a first direction 234 to approach the second rib 124. Additionally, in operation, the third rib 126 may be pushed in a second direction 236 to approach the second rib 124. When the first rib 122 is pushed in the first direction 234, the first gripping leg 140 pivots in a third direction 238 to release the first plurality of teeth 146 from the third plurality of teeth 202. Further in operation, when the third rib 126 is pushed in the second direction 236, the second gripping leg 142 pivots in a fourth direction 240 to release the second plurality of teeth 148 from the fourth plurality of teeth 204. In other words, the first gripping leg 140 and the first rib 122 are pivotably connected to the end wall 118. Further, the second gripping leg 142 and second rib 124 are pivotably connected to the end wall 118. Thus, when the first rib 122 and the third rib 126 are squeezed together (e.g., by an operator's fingers), the first gripping leg 140 and the second gripping leg 142 release the insert 108. In other words, the insert 108 is selectively removable and/or releasable from the base 104.

With reference to FIGS. 20-30, a second example fastener assembly 300 includes a second example base 304, a second example insert 308, and a gasket 312. In some embodiments, the base 304 and the insert 308 are formed of a thermoplastic polymer (e.g., polyoxymethylene (POM) or nylon). In some embodiments, the thermoplastic polymer is infused with glass fibers. In some embodiments, the gasket 312 is formed of a thermoplastic elastomer (TPE).

Figure 23:
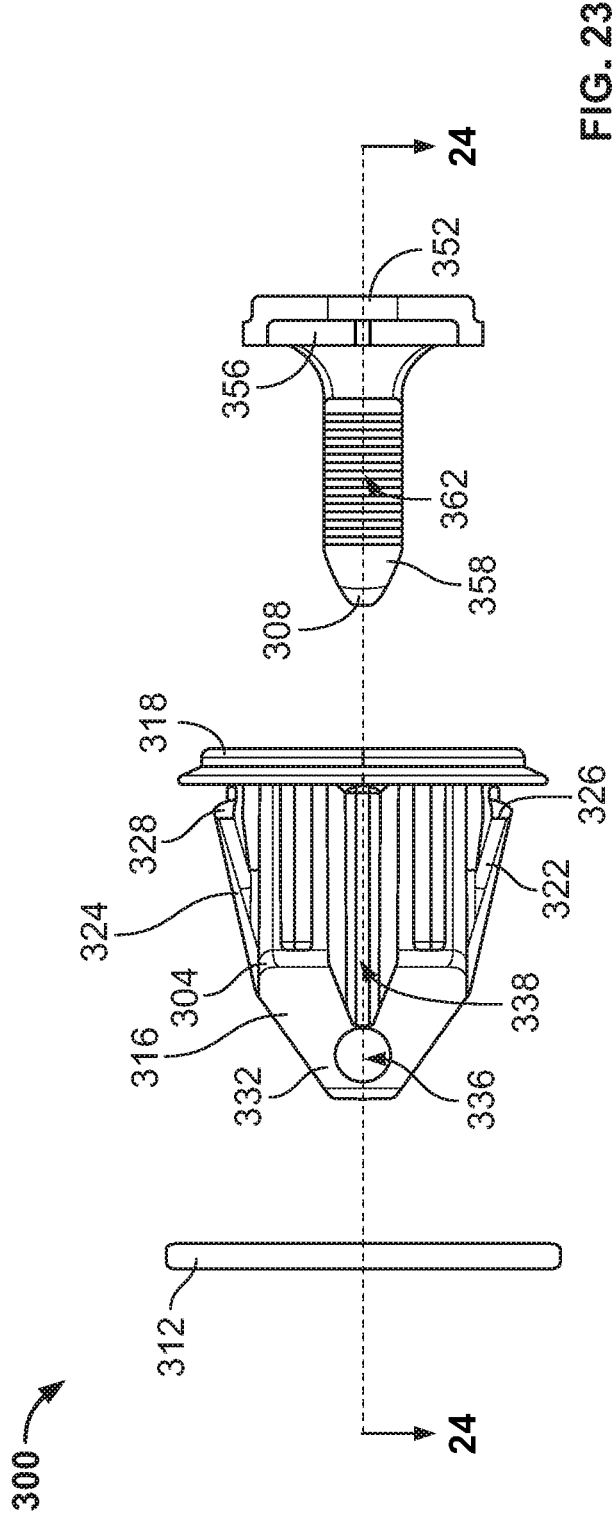
FIG. 23 is another side exploded view of the second example fastener assembly of FIGS. 20-22.
Figure 24:
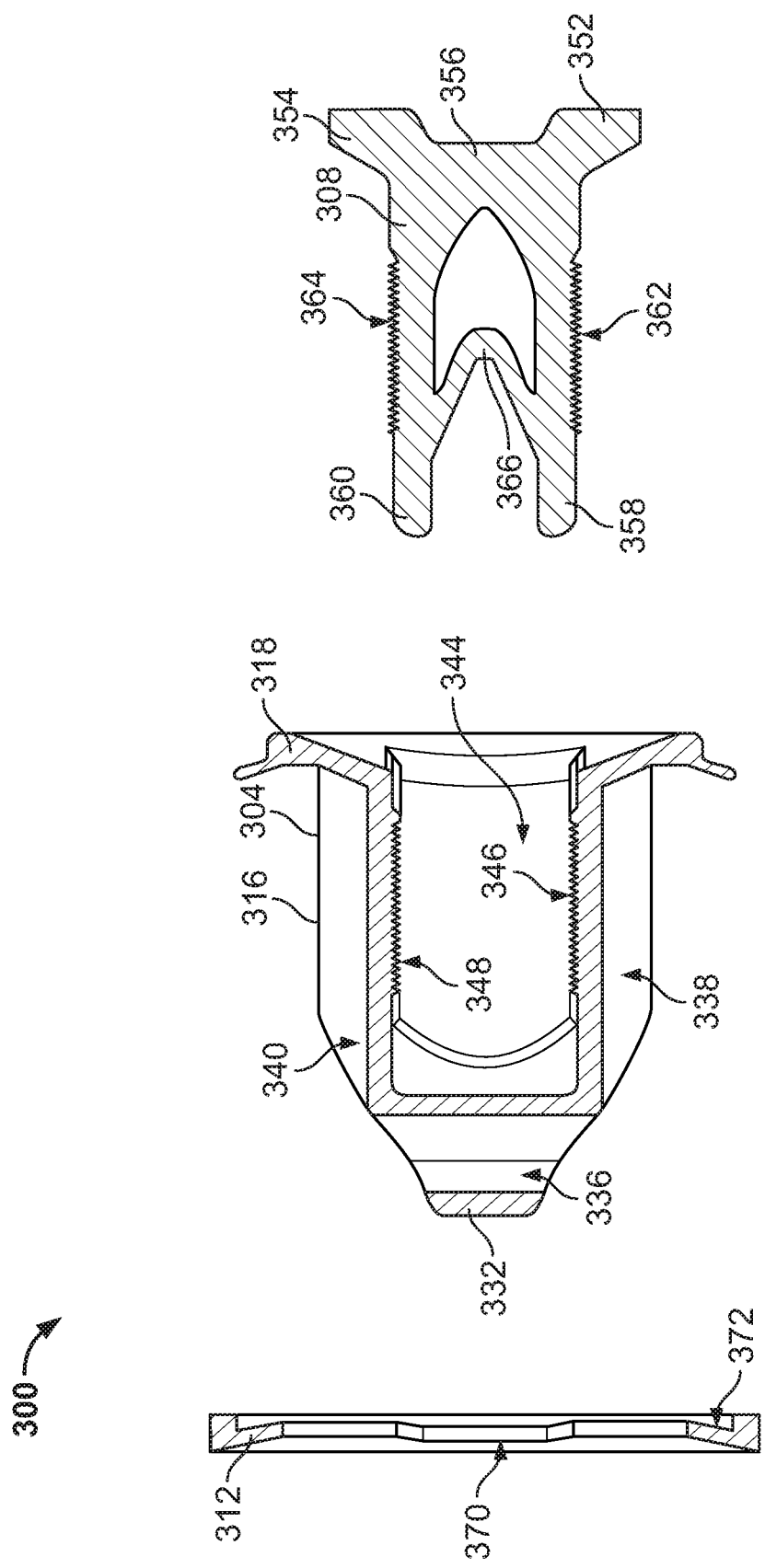
FIG. 24 is an exploded cross-sectional view of the second example fastener assembly of FIGS. 20-23 taken along line 24-24 of FIG. 23.
Figure 25:
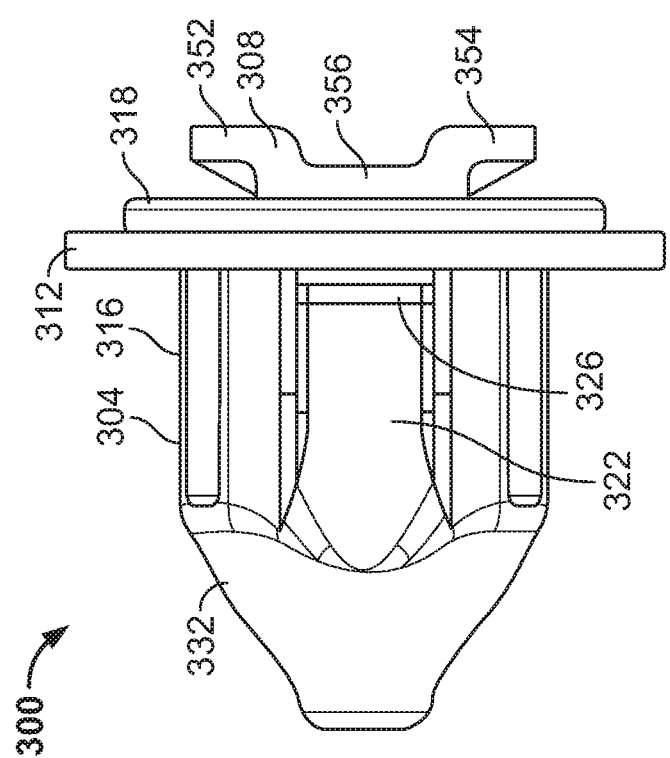
FIG. 25 is a side view of the second example fastener assembly of FIGS. 20-24.

With reference to FIG. 23, the base 304 includes a body 316, a flange 318, a first snap wing 322, and a second snap wing 324. The first snap wing 322 includes a first shoulder 326. The first shoulder 326 extends outwardly. The second snap wing 324 includes a second shoulder 328. The second shoulder 328 extends outwardly. The body 316 includes a conical tip 332. The body 316 defines an opening 336 through the conical tip 332. With reference to FIG. 24, the body 316 defines a first groove 338, a second groove 340, and a cavity 344. The first groove 338 and the second groove 340 are generally parallel. The cavity 344 is between the first groove 338 and the second groove 340. The body 316 includes a first plurality of teeth 346 and a second plurality of teeth 348.

Figure 22:
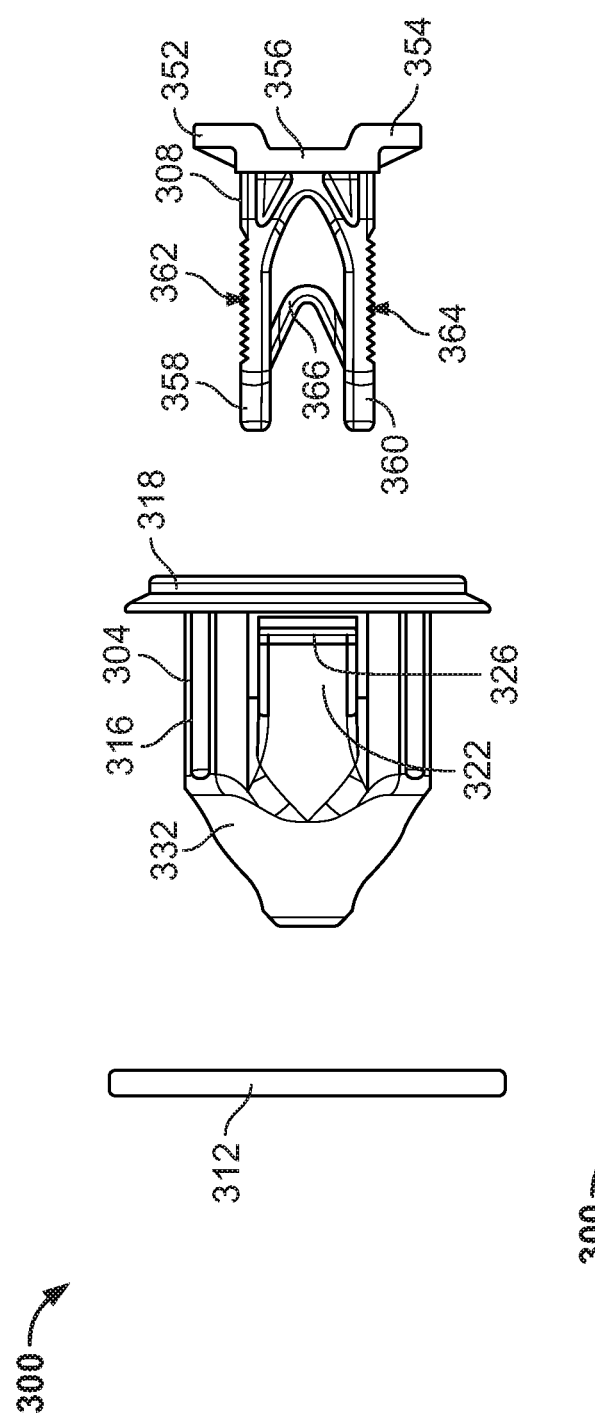
FIG. 22 is a side exploded view of the second example fastener assembly of FIGS. 20 and 21.

With reference to FIG. 22, the insert 308 includes a first mounting tab 352, a second mounting tab 354, a connecting wall 356, a first gripping leg 358, a second gripping leg 360, a third plurality of teeth 362, a fourth plurality of teeth 364, and a leaf spring 366.

With reference to FIG. 21, the gasket 312 is annular and defines an opening 370 and an annular slot 372.

With reference to FIG. 24, the flange 318 extends radially outwardly from the body 316. With reference to FIG. 23, the first snap wing 322 extends diagonally outwardly from the body 316. The second snap wing 324 extends diagonally outwardly from the body 316. With reference to FIG. 24, the body 316 includes a first plurality of teeth 346 that extend inwardly into the cavity 344. The second plurality of teeth 348 extend inwardly into the cavity 344. The first plurality of teeth 346 and the second plurality of teeth 348 face one another.

With reference to FIG. 24, the first mounting tab 352 and the second mounting tab 354 extend laterally outwardly from the connecting wall 356. The first gripping leg 358 and the second gripping leg 360 extend from the connecting wall 356. The first gripping leg 358 and the second gripping leg 360 are generally parallel with one another. The third plurality of teeth 362 extend outwardly from the first gripping leg 358. The fourth plurality of teeth 364 extend outwardly from the second gripping leg 360. The leaf spring 366 is between and is connected to the first gripping leg 358 and the second gripping leg 360. Thus, the leaf spring 366 is between the third plurality of teeth 362 and the fourth plurality of teeth 364.

Figures 26, 27:
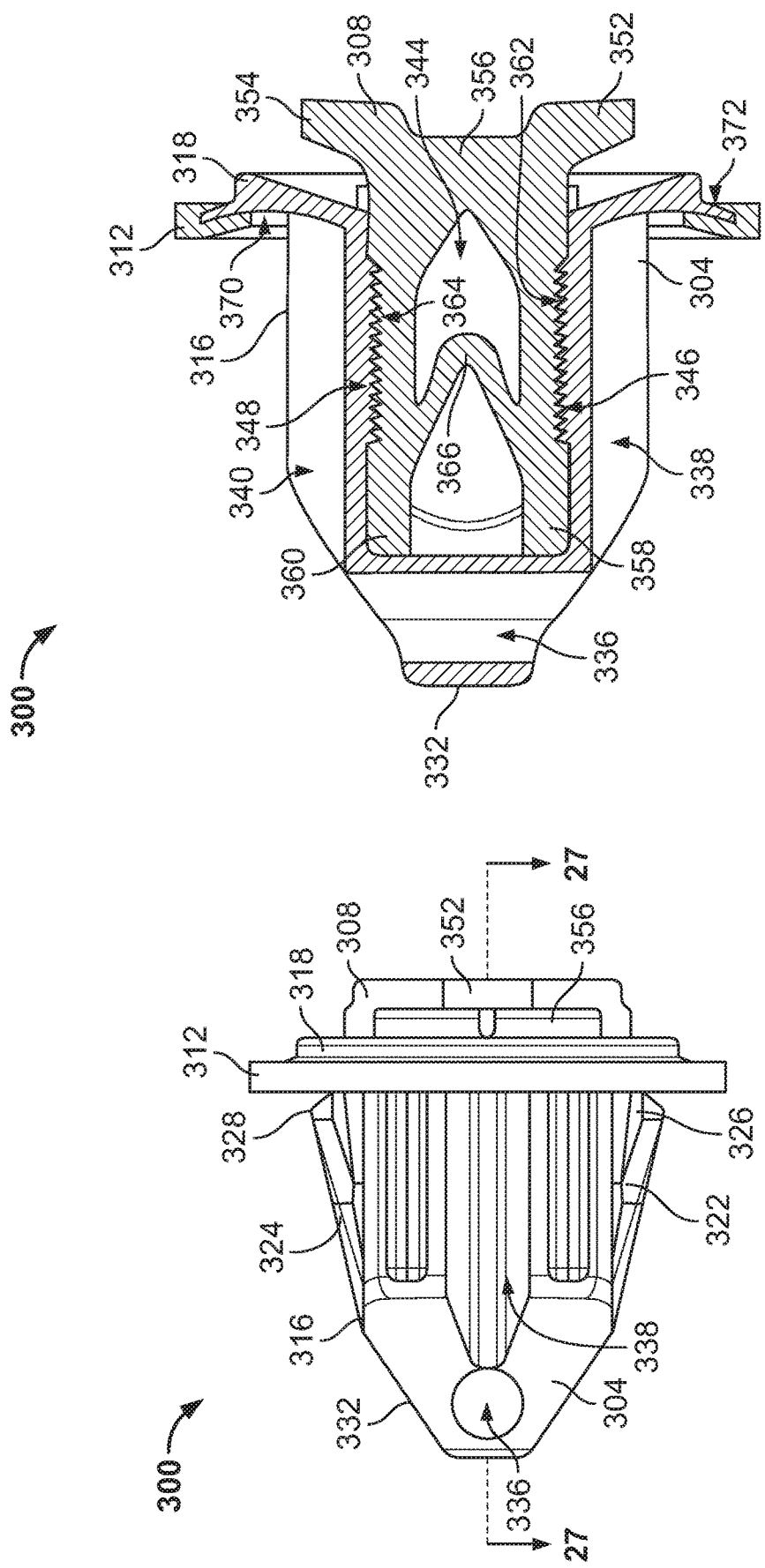
FIG. 26 is another side view of the second example fastener assembly of FIGS. 20-25.
FIG. 27 is a cross-sectional view of the second example fastener assembly of FIGS. 20-26 taken along line 27-27 of FIG. 26.
Figure 29:
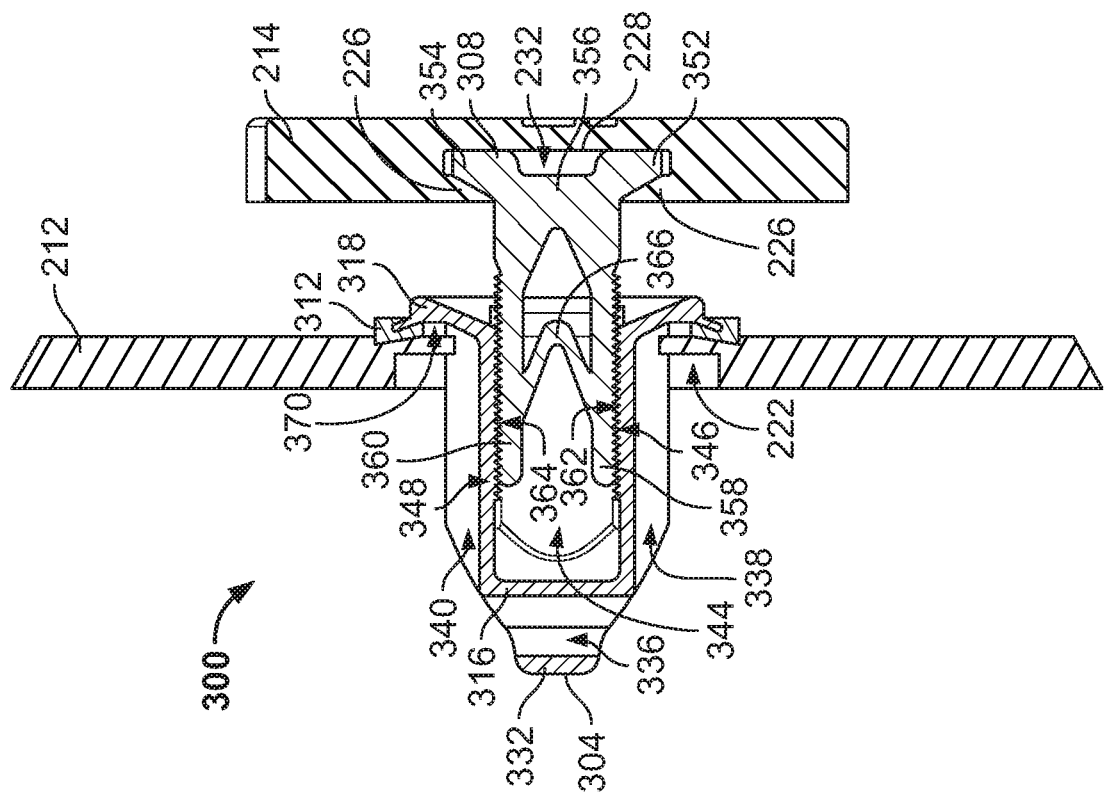
FIG. 29 is a cross-sectional view of the second example fastener assembly of FIGS. 20-28 installed with the first and second panels of FIGS. 8-19 and 28 taken along line 29-29 of FIG. 28.
Figure 28:
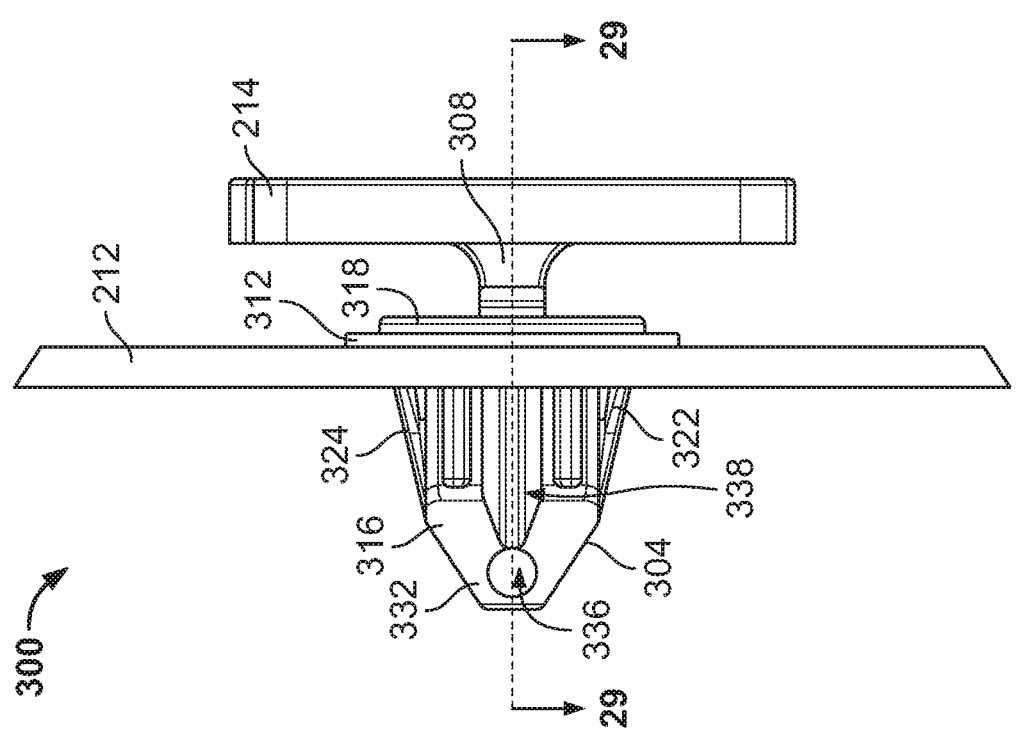
FIG. 28 is a side view of the second example fastener assembly of FIGS. 20-27 with a second example base of the second example fastener assembly installed in the first panel of FIGS. 8-19 and a second example insert of the second example fastener assembly installed in the second panel of FIGS. 8-19.

With reference to FIG. 27, the first plurality of teeth 346 complement the third plurality of teeth 362. The second plurality of teeth 348 complement the fourth plurality of teeth 364. In operation, to assemble the second example fastener assembly 300, the insert 308 is pushed into the base 304. Additionally, the gasket 312 is engaged with the flange 318 via the annular slot 372. More specifically, the flange 318 is inserted into the annular slot 372. With reference to FIG. 29, in operation, when the insert 308 is pushed into the base 304, the first gripping leg 358 and the second gripping leg 360 flex toward one another to compress the leaf spring 366. Further, as the insert 308 is pushed into the base 304, the first plurality of teeth 346 ratchetingly engage the third plurality of teeth 362. Additionally, as the insert 308 is pushed into the base 304, the second plurality of teeth 348 ratchetingly engage the fourth plurality of teeth 364. The leaf spring 366 urges the first gripping leg 358 and the second gripping leg 360 outwardly apart. Thus, the first plurality of teeth 346 remains engaged with the third plurality of teeth 362 and the second plurality of teeth 348 remains engaged with the fourth plurality of teeth 364. In other words, the insert 308 is received in the cavity 344 defined by the base 304.

With reference to FIG. 29, further in operation, the insert 308 is slidingly mounted to the second panel 214 via the keyhole slot 232. The first mounting tab 352 and the second mounting tab 354 are engaged with the recessed surface 228. The first mounting tab 352 and the second mounting tab 354 are retained in the second panel 214 by the mounting tabs 226.

With reference to FIG. 31, in operation, to mount the base 304 to the first panel 212, the first snap wing 322 and the second snap wing 324 are pushed through the opening 222. As the first snap wing 322 and the second snap wing 324 pass through the first panel 212 from the top side 218 to the bottom side 220 via the opening 222, the first snap wing 322 and the second snap wing 324 flex inwardly toward one another. When the first snap wing 322 and the second snap wing 324 exit the opening 222 at the bottom side 220, the first snap wing 322 and the second snap wing 324 resiliently rebound outwardly relative to one another to engage the first shoulder 326 and the second shoulder 328 with the bottom side 220. Thus, when the first example fastener assembly 100 is mounted to first panel 212, the first snap wing 130 and the second snap wing 132 snapably engage the first panel 212. Further, when the base 304 is snapably seated in the first panel 212, the gasket 312 is compressed between the flange 318 and the top side 218.

With reference to FIG. 31, in operation, in some instances, the base 304 is pushed into the first panel 212 via the flange 318. In some instances, a tool (e.g., a hex key, a string, a wire, etc.) (not shown) may be inserted into the opening 336 to pull the base 304 through the opening 222.

With reference to FIG. 31, in operation, in some instances, a wrench socket (not shown) may be placed about the base 304 and pushed toward the bottom side 220 of the first panel 212 to inwardly flex the first snap wing 322 and the second snap wing 324 relative to one another. Thus, the first shoulder 326 and the second shoulder 328 disengage from the bottom side 220 and the second example fastener assembly 300 may be released from the first panel 212. It should be understood that any suitable tool (e.g., a screwdriver or pliers) or an operator's fingers may be used to inwardly flex the first snap wing 322 and the second snap wing 324.

With reference to FIG. 32, a third example insert 408 includes a first post 412, a second post 414 a first wall 418, a second wall 420, a first leaf spring 424, a second leaf spring 426, a first plurality of teeth 446, and a second plurality of teeth 448. The third example insert 408 further includes the first mounting tab 352, the second mounting tab 354, and the connecting wall 356. The first mounting tab 352 and the second mounting tab 354 are connected to and extend from the connecting wall 356 as described above.

Figure 35:
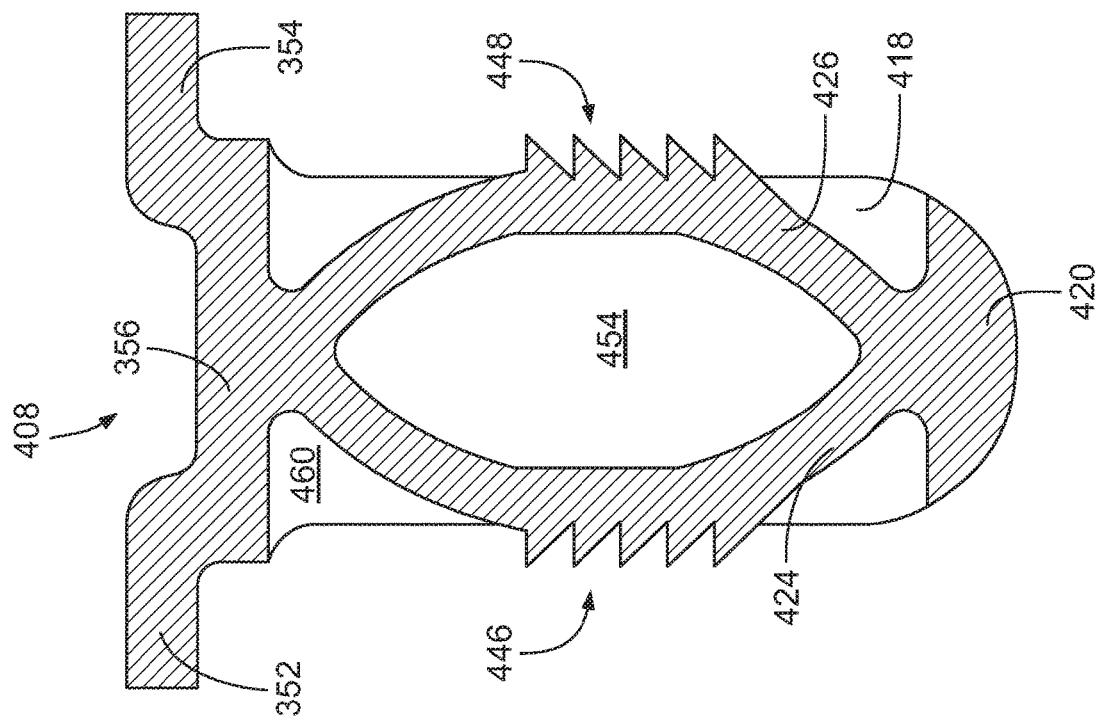
FIG. 35 is a cross-sectional view of the third example insert of FIGS. 32, 33, and 34 taken along line 35-35 of FIG. 32. Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

With reference to FIGS. 32 and 35, the first post 412, the second post 414, and the first wall 418 are connected to and extend from the connecting wall 356. The first post 412, the second post 414, and the first wall 418 and connected to and extend from the second wall 420. Thus, the first post 412, the second post 414, and the first wall 418 extend between the connecting wall 356 and the second wall 420.

Figure 34:
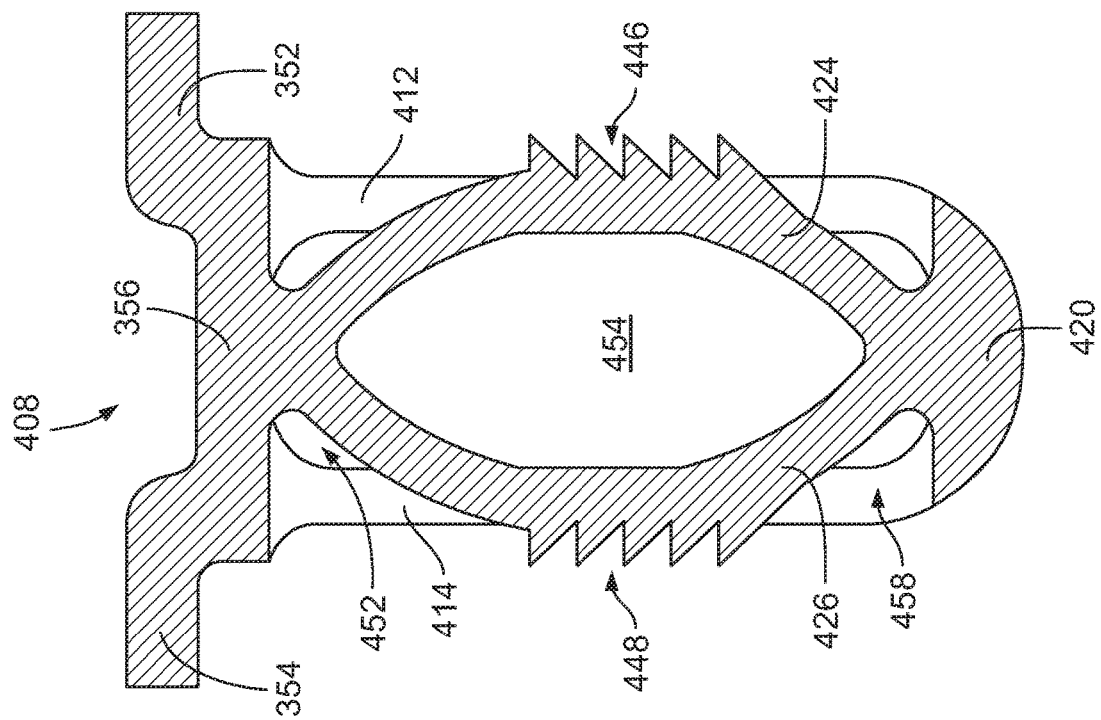
FIG. 34 is a cross-sectional view of the third example insert of FIGS. 31 and 32 taken along line 33-33 of FIG. 32.

With reference to FIGS. 32, 34 and 35, the first leaf spring 424 a second leaf spring 426 are resiliently connected to and extend from the connecting wall 356. The first leaf spring 424 a second leaf spring 426 are also resiliently connected to and extend from the second wall 420. Thus, the first leaf spring 424 a second leaf spring 426 extend between the connecting wall 356 and the second wall 420. The first plurality of teeth 446 extends outwardly from the first leaf spring 424. The second plurality of teeth 448 extends outwardly from the second leaf spring 426. With reference to FIGS. 32, 34, and 35, the first plurality of teeth 446 extend beyond first post 412 and the first wall 418. Additionally, the second plurality of teeth 448 extend beyond the second post 414 and the first wall 418.

With reference to FIG. 32, the first leaf spring 424 is between the first post 412 and the first wall 418. The second leaf spring 426 is between the second post 414 and the first wall 418. The first leaf spring 424 and the second leaf spring 426 are arcuate. The first leaf spring 424 and the second leaf spring 426 transitionally connect to one another at the connecting wall 356. The first leaf spring 424 and the second leaf spring 426 also transitionally connect to one another at the second wall 420. In other words, the first leaf spring 424 and the second leaf spring 426 arcuate and bow outwardly away from one another.

With reference to FIG. 32, the first post 412, the second wall 420, the second post 414, and the connecting wall 356 define a first window 452. With reference to FIGS. 32 and 35, the first leaf spring 424 and the second leaf spring 426 define a second window 454. With reference to FIG. 33, the first post 412, the connecting wall 356, the first leaf spring 424, and the second wall 420 define a first slot 458. Additionally, the first wall 418, the connecting wall 356, the first leaf spring 424, and the second wall 420 define a second slot 460. With reference to FIG. 35, the second leaf spring 426 further defines the first slot 458. With reference to FIG. 34, the second leaf spring 426 further defines the second slot 460.

With reference to FIG. 33, the first wall 418, the second wall 420, the first post 412, and the connecting wall 356 define a first passage 464. The first plurality of teeth 446 extend through the first passage 464. With reference to FIG. 32, the first wall 418, the second wall 420, the second post 414, and the connecting wall 356 define a second passage 466. The second plurality of teeth 448 extend through the second passage 466. The first window 452, the second window 454, the first slot 458, the second slot 460, the first passage 464, and the second passage 466 are in communication with one another.

Looking at FIGS. 34 and 7 together, in operation, the third example insert 408 (shown in FIG. 34) may be used in conjunction with the base 104 (shown in FIG. 7) in the same manner as the first example insert 108. More specifically, the first plurality of teeth 446 of the insert 408 (shown in FIG. 34) are configured to complement and ratchetlingly engage the first plurality of teeth 146 of the base 104 (shown in FIG. 7). Further, the second plurality of teeth 448 of the insert 408 (shown in FIG. 34) are configured to complement and ratchetlingly engage the second plurality of teeth 148 of the base 104 (shown in FIG. 7).

Looking still at FIGS. 32 and 7 together, in operation, when the insert 408 (shown in FIG. 34) is pushed into the base 104 (shown in FIG. 7), the first leaf spring 424 and the second leaf spring 426 (shown in FIG. 34) compressively flex toward one another. The first leaf spring 424 urges the first plurality of teeth 446 outwardly. The second leaf spring 426 urges the second plurality of teeth 448 outwardly. Thus, the first plurality of teeth 446 of the insert 408 remains engaged with the first plurality of teeth 146 of the base 104 (shown in FIG. 7). Further, the second plurality of teeth 448 of the insert 408 remains engaged with the second plurality of teeth 148 of the base 104 (shown in FIG. 7). In other words, the insert 408 is received in the cavity 158 defined by the base 104.

Looking at FIGS. 34 and 27 together, in operation, the third example insert 408 (shown in FIG. 34) may be used in conjunction with the base 304 (shown in FIG. 27) in the same manner as the second example insert 308. More specifically, the first plurality of teeth 446 of the insert 408 (shown in FIG. 34) are configured to complement and ratchetlingly engage the first plurality of teeth 346 of the base 304 (shown in FIG. 27). Further, the second plurality of teeth 448 of the insert 408 (shown in FIG. 34) are configured to complement and ratchetlingly engage the second plurality of teeth 348 of the base 304 (shown in FIG. 27).

Looking still at FIGS. 32 and 27 together, in operation, when the insert 408 (shown in FIG. 34) is pushed into the base 304 (shown in FIG. 27), the first leaf spring 424 and the second leaf spring 426 (shown in FIG. 34) compressively flex toward one another. Thus, the first plurality of teeth 446 of the insert 408 remains engaged with the first plurality of teeth 346 of the base 304 (shown in FIG. 27). Further, the second plurality of teeth 448 of the insert 408 remains engaged with the second plurality of teeth 348 of the base 304 (shown in FIG. 27). In other words, the insert 408 is received in the cavity 344 defined by the base 304.

From the foregoing, it will be appreciated that the above first example fastener assembly 100 and second example fastener assembly 300 robustly join panels together without specialized tooling and in few steps. Thus, the first example fastener assembly 100 and the second example fastener assembly 300 may aid in quickly and reliably joining panels together. Further, because the first example fastener assembly 100 and the second example fastener assembly 300 may be used without specialized tooling, panels may be joined in and out of an assembly plant setting. Thus, a vehicle dealership may, for example, mount additional panels (e.g., a spoiler or door protector rails) to a vehicle according to a customer's order. Additionally, because the first example fastener assembly 100 and the second example fastener assembly 300 may be formed of polymers, the first example fastener assembly 100 and the second example fastener assembly 300 may be lighter than existing fastener assemblies. Thus, the first example fastener assembly 100 and the second example fastener assembly 300 may provide a cost, material, and/or energy savings (e.g., in vehicle fuel economy or assembly plant electricity usage) as compared to existing fastener assemblies.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A fastener assembly, comprising:
an insert consisting of a unitary body and including a first gripping leg and a second gripping leg extending from a connecting wall that extends between a first mounting tab and a second mounting tab of the insert, the first gripping leg including a first plurality of teeth extending outwardly from the first gripping leg; and
a base defining a cavity to receive the insert and including a second plurality of teeth to engage with the first plurality of teeth,
wherein, as the insert is received in the cavity, the first gripping leg is configured to flex away from the second plurality of teeth so that the first plurality of teeth ratchetingly engage the second plurality of teeth.

2. The fastener assembly of claim 1, wherein the second plurality of teeth extend inwardly into the cavity.

3. The fastener assembly of claim 1, wherein the base further includes a snap wing.

4. The fastener assembly of claim 3, wherein the snap wing includes an outwardly extending shoulder.

5. The fastener assembly of claim 1, wherein the insert includes a leaf spring to urge the first plurality of teeth radially outwardly.

6. The fastener assembly of claim 1, wherein the insert is removable from the base.

7. A fastener assembly, comprising:
an insert having a first plurality of teeth extending away from an arcuately shaped spring;
a base including a
body having a second plurality of teeth to ratchetingly engage with the first plurality of teeth and defining a cavity to receive the insert, and
a flange extending radially outwardly from the body; and
a gasket engaged with the flange,
wherein the spring urges the first plurality of teeth radially outwardly to engage with the second plurality of teeth.

8. The fastener assembly of claim 7, wherein the gasket defines an annular slot and the flange is inserted into the annular slot.

9. The fastener assembly of claim 7, wherein the spring is configured to urge the first plurality of teeth against the second plurality of teeth.

10. The fastener assembly of claim 1, wherein the second gripping leg includes a third plurality of teeth extending outwardly from the second gripping leg.

11. The fastener assembly of claim 10, wherein the base further includes a fourth plurality of teeth to engage with the third plurality of teeth.

12. The fastener assembly of claim 1, wherein the insert is configured to be mounted to a first panel, and the base is configured to be mounted to a second panel.

13. The fastener assembly of claim 7, wherein the insert is configured to be mounted to a first panel, and the base is configured to be mounted to a second panel.

\* \* \* \* \*